United States Patent
Schowengerdt et al.

(10) Patent No.: US 12,055,707 B2
(45) Date of Patent: Aug. 6, 2024

(54) METHOD AND SYSTEM FOR FIBER SCANNING PROJECTOR

(71) Applicant: Magic Leap, Inc., Plantation, FL (US)

(72) Inventors: Brian T. Schowengerdt, Seattle, WA (US); Mathew D. Watson, Bellevue, WA (US); Charles David Melville, Camano Island, WA (US); Samuel Scott Frank, Shoreline, WA (US)

(73) Assignee: Magic Leap, Inc., Plantation, FL (US)

( * ) Notice: Subject to any disclaimer, the term of this patent is extended or adjusted under 35 U.S.C. 154(b) by 528 days.

(21) Appl. No.: 17/306,779

(22) Filed: May 3, 2021

(65) Prior Publication Data

US 2021/0325662 A1 Oct. 21, 2021

Related U.S. Application Data

(63) Continuation of application No. 15/927,765, filed on Mar. 21, 2018, now Pat. No. 11,022,793.
(Continued)

(51) Int. Cl.
*H04N 9/31* (2006.01)
*G02B 26/10* (2006.01)
(Continued)

(52) U.S. Cl.
CPC ....... *G02B 26/103* (2013.01); *G02B 27/0172* (2013.01); *H04N 9/3129* (2013.01);
(Continued)

(58) Field of Classification Search
CPC ............. G02B 26/103; G02B 27/0172; G02B 27/283; G02B 27/30; G02B 2027/0125;
(Continued)

(56) References Cited

U.S. PATENT DOCUMENTS

| 5,886,822 A | 3/1999 | Spitzer |
| 5,898,805 A | 4/1999 | Kanazawa et al. |

(Continued)

FOREIGN PATENT DOCUMENTS

| AU | 2018239353 A1 | 9/2019 |
| CA | 3056787 A1 | 9/2018 |

(Continued)

OTHER PUBLICATIONS

Application No. IL269095, "Office Action", Aug. 21, 2022, 4 pages.
(Continued)

*Primary Examiner* — Michael Lee
(74) *Attorney, Agent, or Firm* — KILPATRICK TOWNSEND & STOCKTON LLP

(57) ABSTRACT

A fiber scanning projector includes a piezoelectric element and a scanning fiber passing through and mechanically coupled to the piezoelectric element. The scanning fiber emits light propagating along an optical path. The fiber scanning projector also includes a first polarization sensitive reflector disposed along and perpendicular to the optical path, a quarter wave plate disposed adjacent the first polarization sensitive reflector, and a second polarization sensitive reflector disposed along and perpendicular to the optical path.

20 Claims, 17 Drawing Sheets

Related U.S. Application Data

(60) Provisional application No. 62/474,461, filed on Mar. 21, 2017.

(51) Int. Cl.
  *G02B 27/01* (2006.01)
  *G02B 27/28* (2006.01)
  *G02B 27/30* (2006.01)

(52) U.S. Cl.
  CPC .... *G02B 2027/0125* (2013.01); *G02B 27/283* (2013.01); *G02B 27/30* (2013.01)

(58) Field of Classification Search
  CPC ............ G02B 17/0808; G02B 17/0856; H04N 9/3129
  See application file for complete search history.

(56) References Cited

U.S. PATENT DOCUMENTS

| | | | |
|---|---|---|---|
| 5,908,300 | A | 6/1999 | Walker et al. |
| 6,302,100 | B1 | 10/2001 | Vandenberg |
| 9,523,852 | B1 | 12/2016 | Brown et al. |
| 9,958,684 | B1* | 5/2018 | Robbins ............ G02B 27/0018 |
| 10,715,794 | B2* | 7/2020 | Schowengerdt ..... H04N 9/3129 |
| 11,022,793 | B2* | 6/2021 | Schowengerdt ..... G02B 26/103 |
| 2004/0254474 | A1 | 12/2004 | Seibel et al. |
| 2007/0296969 | A1 | 12/2007 | Goldstein et al. |
| 2009/0316116 | A1* | 12/2009 | Melville .............. H04N 9/3129 348/742 |
| 2010/0201985 | A1 | 8/2010 | Wang et al. |
| 2012/0140301 | A1 | 6/2012 | Xu et al. |
| 2013/0242405 | A1 | 9/2013 | Gupta |
| 2014/0232993 | A1* | 8/2014 | Kim ..................... G02B 26/103 353/31 |
| 2015/0205126 | A1 | 7/2015 | Schowengerdt |
| 2015/0268415 | A1 | 9/2015 | Schowengerdt et al. |
| 2017/0038579 | A1 | 2/2017 | Yeoh et al. |
| 2017/0248784 | A1* | 8/2017 | Fujiwara ............ G02B 23/2469 |
| 2018/0088325 | A1 | 3/2018 | Brown et al. |
| 2018/0120559 | A1* | 5/2018 | Yeoh ................... G02B 26/105 |
| 2018/0136455 | A1* | 5/2018 | Fujinuma ........... G02B 23/2423 |
| 2018/0149862 | A1* | 5/2018 | Kessler ............... G02B 5/3083 |
| 2018/0252925 | A1 | 9/2018 | Schowengerdt |
| 2018/0275396 | A1 | 9/2018 | Schowengerdt et al. |
| 2020/0014892 | A1* | 1/2020 | Wang .................. H04N 9/3135 |

FOREIGN PATENT DOCUMENTS

| | | |
|---|---|---|
| CN | 1444094 A | 9/2003 |
| CN | 1639611 A | 7/2005 |
| CN | 1669066 A | 9/2005 |
| CN | 101909509 A | 12/2010 |
| CN | 105934902 A | 9/2016 |
| CN | 110446963 A | 11/2019 |
| EP | 3602167 A1 | 2/2020 |
| JP | 11153772 A | 6/1999 |
| JP | 11326816 A | 11/1999 |
| JP | 2000511306 A | 8/2000 |
| JP | 2000310743 A | 11/2000 |
| JP | 2002040359 A | 2/2002 |
| JP | 2003513332 A | 4/2003 |
| JP | 2003322825 A | 11/2003 |
| JP | 2006178033 A | 7/2006 |
| JP | 2007010830 A | 1/2007 |
| JP | 2009503585 A | 1/2009 |
| JP | 2015106146 A | 6/2015 |
| JP | 2017500605 A | 1/2017 |
| JP | 2018528457 A | 9/2018 |
| JP | 2020514828 A | 5/2020 |
| KR | 20190126414 A | 11/2019 |
| WO | 2016205256 A1 | 12/2016 |
| WO | 2017015302 A1 | 1/2017 |
| WO | 2018175542 A1 | 9/2018 |

OTHER PUBLICATIONS

U.S. Appl. No. 15/927,765, Advisory Action, mailed on Jun. 2, 2020, 3 pages.
U.S. Appl. No. 15/927,765, Advisory Action, mailed on Jun. 29, 2020, 3 pages.
U.S. Appl. No. 15/927,765, Final Office Action, mailed on Feb. 18, 2020, 8 pages.
U.S. Appl. No. 15/927,765, Non-Final Office Action, mailed on Aug. 7, 2019, 9 pages.
U.S. Appl. No. 15/927,765, Non-Final Office Action, mailed on Feb. 4, 2019, 9 pages.
U.S. Appl. No. 15/927,765, Non-Final Office Action, mailed on Jul. 30, 2020, 9 pages.
U.S. Appl. No. 15/927,765, Notice of Allowance, mailed on Feb. 1, 2021, 6 pages.
Chinese Application No. CN201880019638.6, Office Action, mailed on Apr. 19, 2021, 13 pages. (8 pages of Original Document and 5 pages of English Translation).
European Application No. 18772208.7, Extended European Search Report, mailed on Feb. 4, 2020, 12 pages.
International Application No. PCT/US2018/023505, International Preliminary Report on Patentability, mailed on Oct. 3, 2019, 8 pages.
International Application No. PCT/US2018/023505, International Search Report and Written Opinion, mailed on Jul. 6, 2018, 11 pages.
International Application No. PCT/US2018/023505, Invitation to Pay Add'l Fees and Partial Search Report, mailed on May 17, 2018, 2 pages.
IN201947037062, "First Examination Report", mailed on Feb. 23, 2022, 7 pages.
Application No. JP2019-551591, Office Action and English Translation, mailed on Jan. 12, 2022, 5 pages.
Application No. JP2022-064961 , "Office Action" and English translation, Apr. 7, 2023, 6 pages.
Application No. KR10-2019-7030676 , "Office Action" and English translation, Mar. 6, 2023, 11 pages.
Japanese Patent Application No. 2022-64961, "Office Action" and English translation, Jul. 11, 2023, 5 pages.
Application No. AU2018239353 , "Notice of Acceptance", Dec. 13, 2022, 3 pages.
Application No. EP18772208.7 , "Office Action", Nov. 3, 2022, 7 pages.
Application No. AU2018239353, "First Examination Report", May 25, 2022, 4 pages.
Korean Patent Application No. 10-2019-7030676, "Office Action" and English translation, Sep. 26, 2023, 8 pages.
CN202111337897.3, "Office Action", Mar. 26, 2024, 8 pages. [no translation available].
EP18772208.7, "Intention to Grant", May 29, 2024, 8 pages.

* cited by examiner

METHOD AND SYSTEM FOR FIBER SCANNING PROJECTOR

CROSS-REFERENCES TO RELATED APPLICATIONS

This application is a continuation of U.S. patent application Ser. No. 15/927,765, filed Mar. 21, 2018, entitled "METHOD AND SYSTEM FOR FIBER SCANNING PROJECTOR," which is a non-provisional of and claims the benefit of and priority to U.S. Provisional Patent Application No. 62/474,461, filed Mar. 21, 2017, entitled "METHOD AND SYSTEM FOR FIBER SCANNING PROJECTOR," the disclosures of which are hereby incorporated by reference in their entirety for all purposes.

BACKGROUND OF THE INVENTION

Modern computing and display technologies have facilitated the development of systems for so called "virtual reality" or "augmented reality" experiences, wherein digitally reproduced images or portions thereof are presented to a viewer in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the viewer.

Despite the progress made in these display technologies, there is a need in the art for improved methods and systems related to augmented reality systems, particularly, display systems.

SUMMARY OF THE INVENTION

The present invention relates generally to methods and systems related to projection display systems including wearable displays. More particularly, embodiments of the present invention provide methods and systems for volumetric displays, also referred to as a light field displays, that create volumetric sculptures of light at more than one depth plane. The invention is applicable to a variety of applications in computer vision and image display systems.

According to an embodiment of the present invention, a projector is provided. The projector includes a scanning light source defining a convex object surface and an optical assembly section operable to receive light from the scanning light source. The optical assembly section includes a prism element; a collimating element coupled to the prism element at an interface; a quarter wave plate; and a polarizing beam splitter disposed at the interface.

According to an embodiment of the present invention, a fiber scanning projector is provided. The fiber scanning projector includes a piezoelectric element, a scanning fiber mechanically coupled to the piezoelectric element, and an optical assembly section operable to receive light from the scanning fiber. The optical assembly section includes a prism element, a collimating element coupled to the prism element at an interface, a quarter wave plate, and a polarizing beam splitter disposed at the interface.

According to another embodiment of the present invention, a fiber scanning projector is provided. The fiber scanning projector includes a piezoelectric element and a scanning fiber passing through and mechanically coupled to the piezoelectric element. The scanning fiber emits light along an optical path. The fiber scanning projector also includes a mirror including an aperture. The scanning fiber passes through the aperture. The fiber scanning projector further includes a collimating mirror disposed along the optical path.

According to a specific embodiment of the present invention, a fiber scanning projector is provided. The fiber scanning projector includes a piezoelectric element and a scanning fiber passing through and mechanically coupled to the piezoelectric element. The scanning fiber emits light along an optical path. The fiber scanning projector also includes a first polarization sensitive reflector disposed along the optical path, a quarter wave plate disposed adjacent the first polarization sensitive reflector, and a second polarization sensitive reflector disposed along the optical path.

Numerous benefits are achieved by way of the present invention over conventional techniques. For example, embodiments of the present invention provide methods and systems that can be used to display images to a user in a form factor comparable to standard eyeglasses. In some embodiments, image projectors integrated with a fiber scanning light source can fit within the frames of the eyeglasses. These and other embodiments of the invention along with many of its advantages and features are described in more detail in conjunction with the text below and attached figures.

DETAILED DESCRIPTION OF SPECIFIC EMBODIMENTS

The present invention relates generally to methods and systems related to projection display systems including wearable displays. More particularly, embodiments of the present invention provide methods and systems for volumetric displays, also referred to as a light field displays, that create volumetric sculptures of light at more than one depth plane. The invention is applicable to a variety of applications in computer vision and image display systems.

Figure 1A:
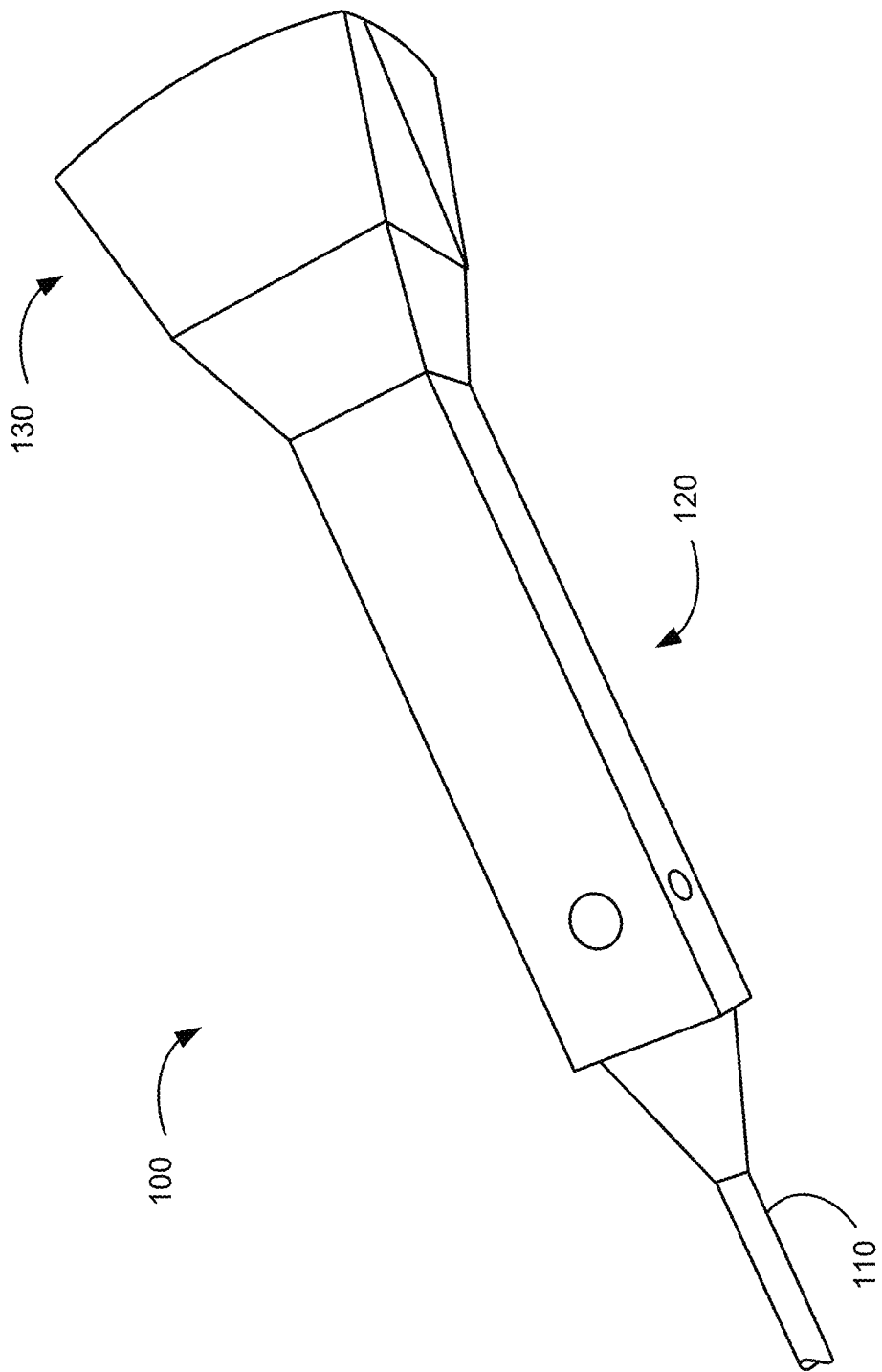
FIG. 1A is a simplified perspective view illustrating a fiber scanning projector according to an embodiment of the present invention.

FIG. 1A is a simplified perspective view illustrating a fiber scanning projector according to an embodiment of the present invention. The fiber scanning projector 100, which can have dimensions on the order of 2 mm×2 mm×7 mm, includes a fiber input 110, a fiber oscillation region 120, and an optical assembly section 130. Driven by piezoelectric actuators (not illustrated), an optical fiber oscillates in the fiber oscillation region 120, for example, in a spiral configuration with an increasing angular deflection during the projection of light for a given frame time. Input light to the fiber scanning projector is provided through fiber input 110 and output light from the fiber scanning projector is provided through one or more of the surfaces of optical assembly section 130. The various elements of the fiber scanning projector are described more fully throughout the present specification.

Figure 1B:
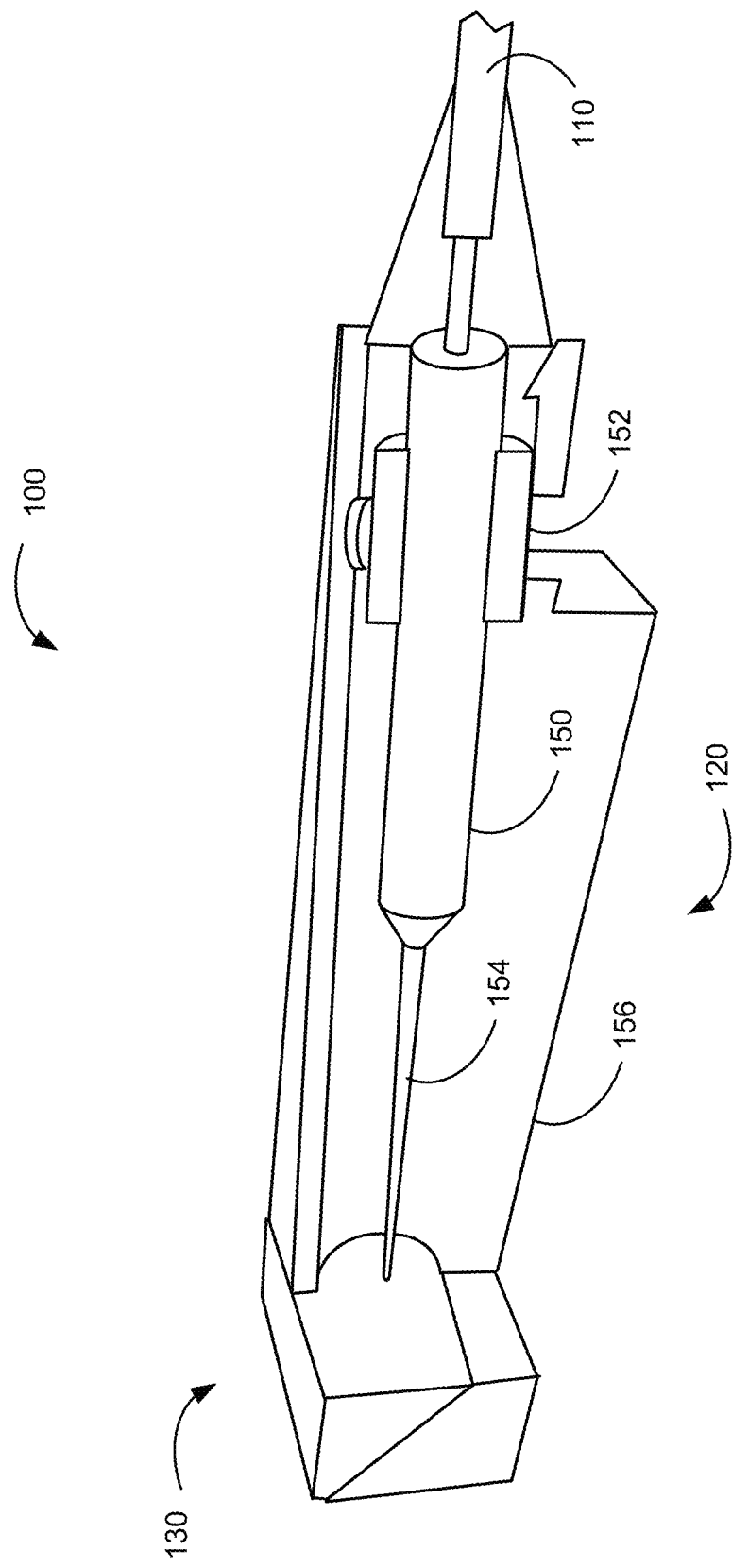
FIG. 1B is a simplified cutaway perspective view illustrating a fiber scanning projector according to an embodiment of the present invention.

FIG. 1B is a simplified cutaway perspective view illustrating a fiber scanning projector according to an embodiment of the present invention. In the view illustrated in FIG. 1B, the fiber scanning projector 100 has been rotated horizontally. The fiber input 110 is illustrated on the right hand side of the figure, providing an input to the fiber oscillation section 120, which includes a piezoelectric actuator 150 supported by a retaining collar 152 (and driven by electric signals from wires that are not shown), and a scanning fiber 154 is disposed in a mechanical enclosure 156. The optical assembly section 130 receives light from the scanning fiber 154 as described more fully herein.

During operation, the scanning fiber 154, which is mechanically attached to the piezoelectric actuator 150, oscillates in the fiber oscillation region 120. In an embodiment, the piezoelectric actuator 150 includes four electrodes distributed at circumferential positions that are shifted 90° with respect to each other. Accordingly, positive and negative voltages applied to opposing sides of the piezoelectric actuator can flex the actuator, and the scanning fiber, in the plane of the electrodes. By driving all four electrodes in synchronization, oscillation of the fiber can be accomplished. As the light exits the scanning fiber 154, it is coupled into optical assembly section 130, described more fully below.

As described more fully herein, small form factors comparable to standard eyeglasses are enabled by embodiments of the present invention. By utilizing embodiments of the present invention, displays with a desired field of view, depth of resolution, integrated inertial motion units (IMUs), cameras, audio components, and the like are provided. In some embodiments, the fiber scanning projector 100 illustrated in FIGS. 1A and 1B is mounted in the temple or frame of the eyeglasses and works in combination with an eyepiece disposed in the frame to direct the projected light toward the eye of the user. The size of the fiber scanning projector 100 enables the integration of multiple fiber scanning projectors that can direct light toward each eye, increasing the field of view through tiling of the display areas. As an example, if two projectors are used per eye, a diagonal field of view of 89° can be provided using two projectors. Using four projectors per eye, a diagonal field of view of 134° can be achieved. Additionally, in addition to increases in the field of view, additional depth planes can be provided through the use of multiple projectors. Additional description related to tiling of display areas and the use of multiple projectors to increase the field of view is provided in U.S. patent application Ser. No. 15/927,821, filed on Mar. 21, 2018, the disclosure of which is hereby incorporated by reference in its entirety for all purposes.

In an embodiment, the fiber scanning projector 100 is fed by fiber input 110 and the fiber oscillation region 120 and the optical assembly section 130 are mounted in the outside edge of the frame as illustrated in FIG. 2 of U.S. patent application Ser. No. 15/927,855, filed on Mar. 21, 2018, the disclosure of which is hereby incorporated by reference in its entirety for all purposes. The output of the optical assembly section 430 is oriented to emit light toward the input coupling elements of the eyepiece mounted in the frame. As an example, light from the output of the optical assembly section could be directed toward the user before it couples into the eyepiece, which can include a world-side cover glass and an eye-side cover glass.

Figure 1C:
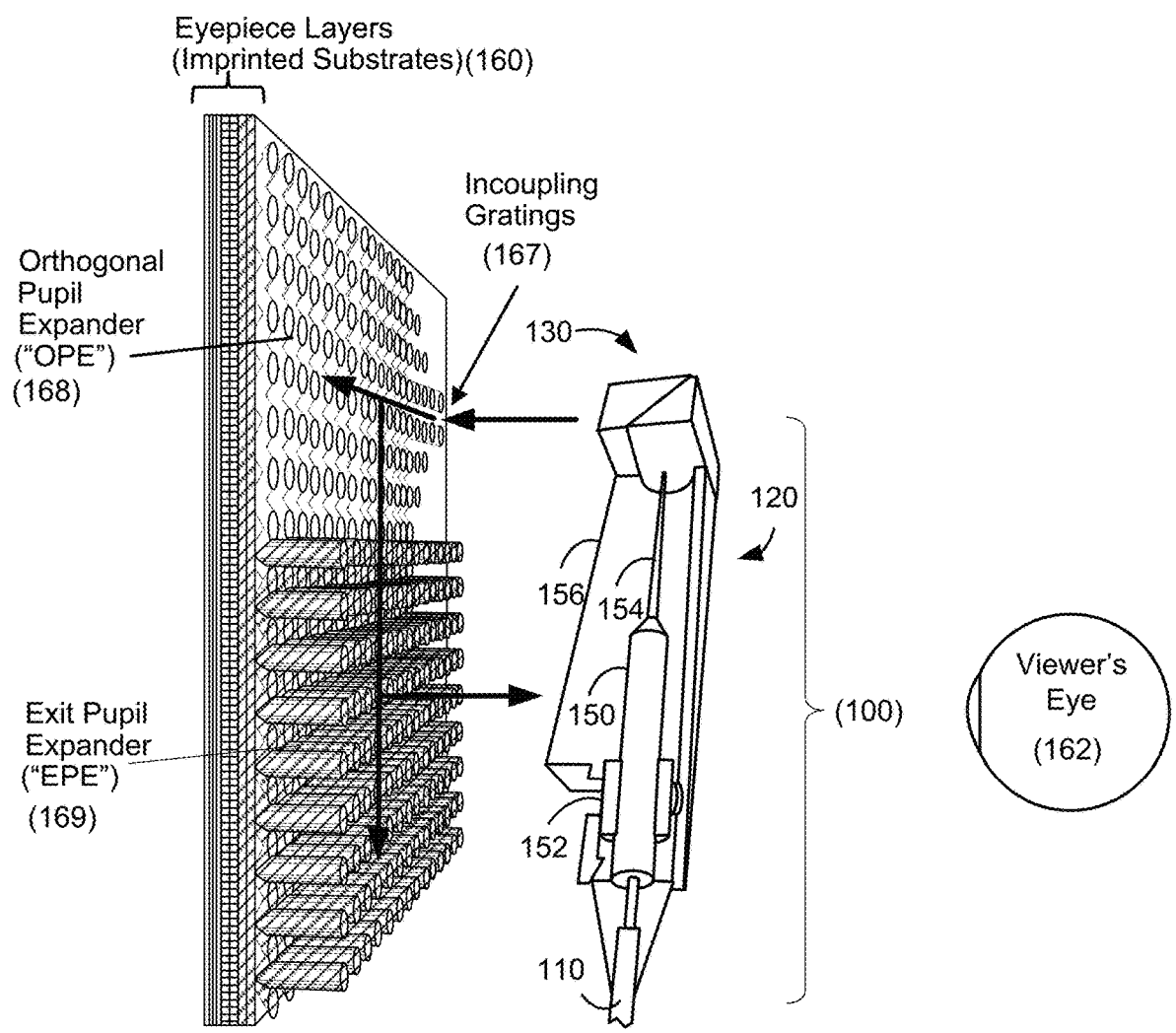
FIG. 1C illustrates schematically the light paths in a viewing optics assembly (VOA) that may be used to present a digital or virtual image to a viewer, according to an embodiment of the present invention.

FIG. 1C illustrates schematically the light paths in a viewing optics assembly (VOA) that may be used to present a digital or virtual image to a viewer, according to an embodiment of the present invention. The VOA includes a projector 100 and an eyepiece 160 that may be worn around or in front of a viewer's eye. As discussed, herein the VOA can be integrated with the frames of a pair of glasses to present the digital or virtual image to a viewer wearing these glasses.

Figure 1D:
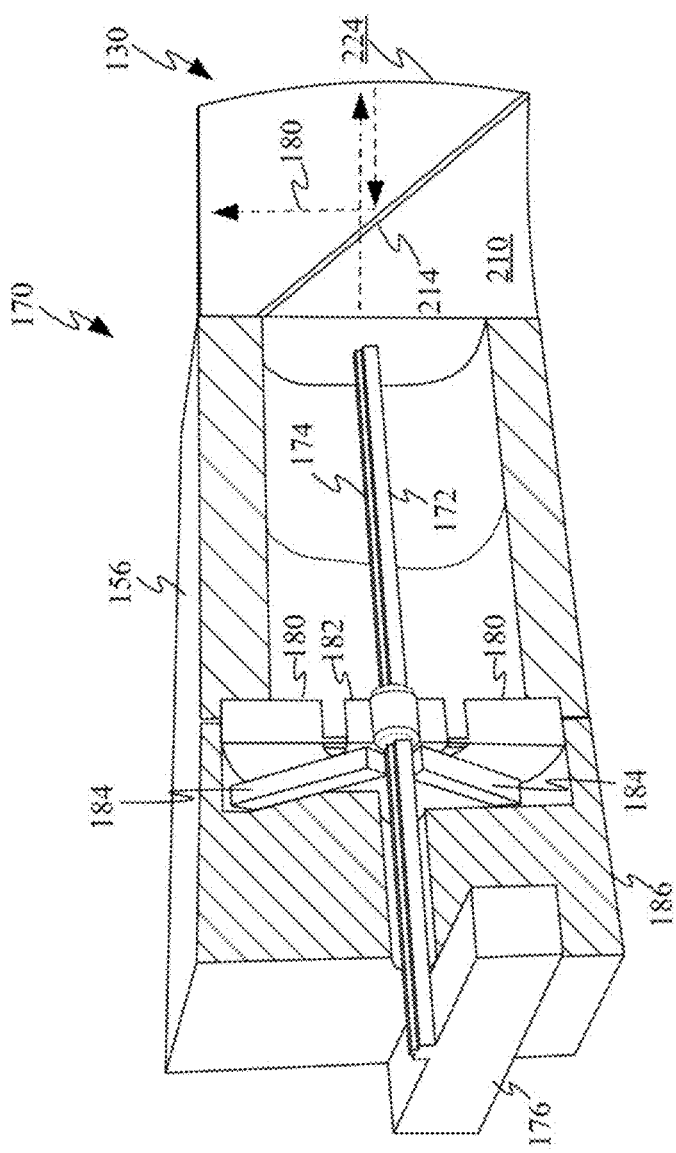
FIG. 1D shows a partial cross-sectional view of a waveguide scanning system using a silicon-based waveguide according to an embodiment of the present invention.

Referring to FIG. 1C, a fiber scanning projector 100 is illustrated. However, it will be appreciated that other scanned light systems or scanned beam systems, which can be implemented, for example, as a scanned waveguide system, which includes a scanning waveguide source, can be utilized in conjunction with embodiments of the present invention. Thus, although an optical fiber as one implementation for waveguiding light is illustrated in some embodiments, the present invention is not limited to fiber scanning systems and other waveguide scanning systems can be utilized according to other embodiments. Examples of other waveguiding systems include microelectromechanical systems (MEMS) that integrate waveguide features, for example, a silicon waveguide integrated with a cantilevered beam, into light scanning systems. Moreover, a scanning mirror system in which a converging beam of light is scanned by the projector to create a curved object surface, can be utilized with embodiments of the present invention as described herein. Furthermore, a scanning point source, for instance a light emitting diode (LED) or an organic LED (OLED) can be utilized in conjunction with the optics described herein. As an example, one implementation of a MEMS-based waveguide scanner is illustrated in FIG. 1D.

Although not illustrated in FIG. 1C, optional projector relay optics can be used to direct light from the fiber scanning projector 100 into eyepiece 160. Since these projector relay optics are optional, they are not required by the present invention and other optical configurations can be utilized according to embodiments of the present invention. In the illustrated embodiment, light exits the optical assembly section in a direction generally perpendicular to the longitudinal axis of the mechanical enclosure 156 of the fiber scanning projector 100 and is collimated, which provides a suitable input for incoupling gratings 167.

During operation, the optical fiber 154, which is mechanically attached to the piezoelectric actuator 150, oscillates in the fiber oscillation region 120. In an embodiment, the piezoelectric actuator 150 includes four electrodes distributed at circumferential positions that are shifted 90° with respect to each other. Accordingly, positive and negative voltages applied to opposing sides of the piezoelectric actuator can flex the actuator, and the scanning fiber, in the plane of the electrodes. By driving all four electrodes in synchronization, oscillation of the fiber can be accomplished. As the light exits the optical fiber 154 as it scans, it is coupled into optical assembly section 130, which redirects the light toward the eyepiece 160.

The fiber scanning projector 100 can provide multiple colors, including the three primary colors, red, green, and blue (RGB) to form a full-color display. Accordingly, the eyepiece 160 may include one or more eyepiece layers. In one embodiment, the eyepiece 160 includes three eyepiece layers, one eyepiece layer for each of the three primary colors, red, green, and blue. In another embodiment, the eyepiece 160 may include six eyepiece layers, i.e., one set of eyepiece layers for each of the three primary colors configured to form a virtual image at one depth plane, and another set of eyepiece layers for each of the three primary colors configured to form a virtual image at another depth plane. In other embodiments, the eyepiece 160 may include three or more eyepiece layers for each of the three primary colors for three or more different depth planes. Each eyepiece layer comprises a planar waveguide and may include an incoupling grating 167, an orthogonal pupil expander (OPE) region 168, and an exit pupil expander (EPE) region 169.

Still referring to FIG. 1C, the projector 100 projects image light onto the incoupling grating 167 in an eyepiece layer 160. The incoupling grating 167 couples the image light from the projector 100 into the planar waveguide propagating in a direction toward the OPE region 168. The waveguide propagates the image light in the horizontal direction by total internal reflection (TIR). The OPE region 168 of the eyepiece layer 160 also includes a diffractive element that couples and redirects a portion of the image light propagating in the waveguide toward the EPE region 169. The EPE region 169 includes an diffractive element that couples and directs a portion of the image light propagating in the waveguide in a direction approximately perpendicular to the plane of the eyepiece layer 160 toward a viewer's eye 162. In this fashion, an image projected by projector 101 may be viewed by the viewer's eye 162.

As described above, image light generated by the projector may include light in the three primary colors, namely blue (B), green (G), and red (R). Such image light can be separated into the constituent colors, for example, temporally or spatially, so that image light in each constituent color may be coupled to a respective waveguide in the eyepiece.

FIG. 1D shows a partial cross-sectional view of a waveguide scanning system using a silicon-based waveguide according to an embodiment of the present invention. In this embodiment, rather than using a tapered optical fiber as the light scanning element, a MEMS scanner 170 incorporating a cantilevered beam including a silicon-based, cantilevered waveguide is utilized.

In the embodiment illustrated in FIG. 1D, light for display through the eyepiece is provided using an optical fiber (not shown) that is optically coupled to waveguide 174 supported by cantilevered beam 172. Cantilevered beam 172 extends from support structure 176, which is mechanically attached to mechanical enclosure 156. Accordingly, light from the optical fiber is able to propagate down waveguide 174, be emitted, and received by optical assembly section 130. As described more fully in relation to FIG. 2A, optical assembly section 130 includes a prism element 210 and a collimation element 220 coupled at an interface, defining beam splitter 214. As illustrated in FIG. 1D, light emitted from waveguide 174 can pass through beam splitter 214, pass through a quarter wave plate (not shown), and impinge on the collimating surface 224. After reflection, the light passes through the quarter wave plate a second time and reflects off of beam splitter 214 as illustrated by optical ray 180.

In order to actuate the cantilevered beam 172, the optical scanner illustrated in FIG. 1D includes a transducer that includes a frame 180 and a hub 182 driven by piezoelectric strips 184. Piezoelectric strips are coupled to both frame 180 and hub 182 to cooperatively induce oscillation of cantilevered beam 172 in a predefined pattern. Bracket 186 can be configured to position cantilevered beam 172, frame 180, and hub 182 relative to optical assembly section 130. Moreover, bracket 186 can be mechanically coupled to mechanical enclosure 156.

As illustrated in FIG. 1D, hub 182 can be configured to rotate in place to achieve a desired scan pattern of cantilevered beam 172. For example, sequential actuation of piezoelectric strips 184 can result in longitudinal extension and contraction of the piezoelectric strips such that the hub is maneuvered in a pattern that oscillates cantilevered beam 172, particularly the waveguide tip, in a spiral scan pattern. In other embodiments, hub 182 can be configured to shift laterally and/or vertically to induce the desired scan pattern, for example, a raster scan pattern. While hub 182 is depicted having a circular shape, it should be appreciated that many other shapes such as elliptical, rectangular, and other polygonal gap geometries are also possible.

Cantilevered beam 172 can be formed from a length of silicon or silicon carbide. The waveguide 174, which can be a single mode waveguide, can be formed using semiconductor processing steps that define an index of refraction difference to support waveguiding. Although cantilevered beam 172 is illustrated as including a single waveguide 174, other embodiments can implement multiple waveguides supported by the cantilevered beam. It should be appreciated that cantilevered beam 172 could also be utilized in conjunction with other actuators, for example, piezoelectric actuator 150 described more fully herein. Thus, the frame and hub implementation illustrated in FIG. 1D is merely exemplary of structures that can be used to actuate the cantilevered beam.

Figure 1E:
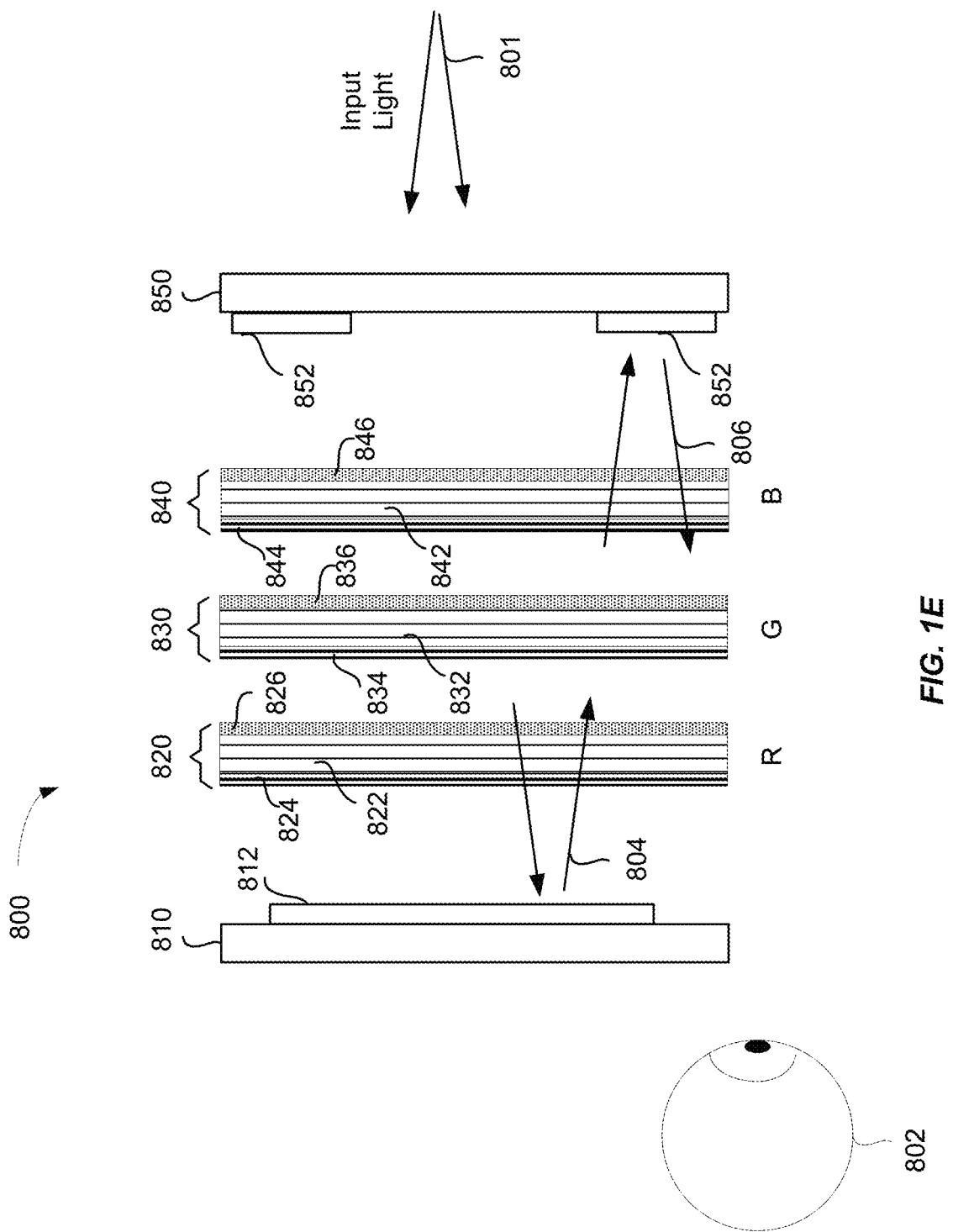
FIG. 1E is a partial cross-sectional view illustrating a structure of an eyepiece according to an embodiment of the present invention.

FIG. 1E is a partial cross-sectional view illustrating a structure of an eyepiece according to an embodiment of the present invention. The region shown in the cross-sectional view includes the region of the incoupling diffractive optical element (e.g., incoupling grating) of the eyepiece 800. As shown in FIG. 1E, the eyepiece 800 includes a stack of waveguide plates 820, 830, and 840 that receive input light from the fiber scanning projector and output image information to the eye 802 of a viewer. The eyepiece 800 illustrated in FIG. 1E includes an eye-side cover layer 810 positioned on the side of the eyepiece adjacent the viewer's eye, and a world-side cover layer 850 positioned on the side of the eyepiece facing toward the world.

In some embodiments, the waveguide plates 820, 830, and 840 include respective planar waveguides 822, 832, or 842, for propagating light in the planes of their respective waveguide plates 820, 830, and 840. Each planar waveguide 822, 832, or 842 has a back surface facing the viewer's eye, and a front surface facing the world. In the embodiment illustrated in FIG. 1E, the waveguide plates 820, 830, and 840 also include respective gratings 824, 834, or 844 disposed on the back surfaces of their respective waveguides 822, 832, or 842, for coupling and redirecting a portion of the light propagating in their respective waveguides 822, 832, or 842.

In the illustrated embodiment, each waveguide 822, 832, or 842, as well as each grating 824, 834, or 844, may be wavelength selective, such that it selectively propagates or redirects light in a given wavelength range. In some embodiments, each of the waveguide plates 820, 830, and 840 may be configured for a respective primary color. For example, the waveguide plate 820 is configured for red (R) light, the waveguide plate 830 is configured for green (G) light, and the waveguide plate 840 is configured for blue (B) light. It will be appreciated that the eyepiece 800 may include two or more waveguide plates for red light, two or more waveguide plates for green light, and two or more waveguide plates for blue light, for different depth planes, as described above. In some other embodiments, other colors, including magenta and cyan, may be used in addition to or may replace one or more of red, green, or blue.

In order to improve the optical efficiency, some embodiments utilize a reflective surface, for example, metallization of the surface, on one of the surfaces, for example, the front surface, of the eye-side cover layer to provide a highly reflective surface (e.g., ~100% reflective coating) that forms a reflective structure behind the input coupling elements (e.g., vertically aligned incoupling gratings) to reflect the input light, which can be RGB light, that passes through the input coupling elements and produce a second pass through the input coupling elements to improve the image brightness. As illustrated in FIG. 1E, reflector 812 reflects input light 801 incident from the fiber scanning projector that is not coupled into the waveguides. After reflection from reflector 812, the input light is able to make a second pass through the input coupling elements and increase the amount of light coupled into the waveguides.

In an alternative embodiment, an annular reflector 852, for example, fabricated using 100% reflective metal coatings, can be placed on the world-side cover glass. Although this annular reflector 852 is shown on the back side of the world-side cover layer 850, this is not required by the present invention and it may alternatively be mounted on the front side. One of ordinary skill in the art would recognize many variations, modifications, and alternatives. In this alternative embodiment, the input light 801 from the fiber scanning projector passes through the center of the annular reflector 852 after it is output from the optical assembly section of the fiber scanning projector. Since the input light is diverging, the beam spreads as it passes through the eyepiece and reflects from the reflector 812 behind the input coupling elements. This reflected light 804 propagates back through the eyepiece, with the cone of light expanding during propagation. In some embodiments, reflected light 804 is also coupled into the incoupling gratings during the return path, being characterized by the same orientation as the input beams for display to the viewer since, although reflected light 804 is the mirror image of input light 801, entry through the opposing side of the incoupling grating results in the same orientation. A substantial portion, which can be the majority, of the light, reflects from the annular reflector 852 on the world-side cover layer as illustrated by doubly reflected light 806 and is able to make a third pass through the input coupling elements, resulting in additional coupling of light into the waveguide plates. As will be evident to one of skill in the art, a Hall of Mirrors effect can be achieved that results in increased brightness correlated with the increased number of rays passing through the eyepiece, improving the fill factor and image quality.

A channel can be cut in the temple and the frames to accommodate the fiber and electrical wiring. As the fiber/wires pass over the spring hinge, the design dimensions enable the fiber to not be bent past is minimum bend radius of curvature as the temples are folded.

In addition to reflective structures associated with the input coupling elements discussed in relation to FIG. 1E, some embodiments utilize a partially reflective (e.g., 50% aluminized) surface on the inside surface of world-side cover glass so that a portion (e.g., half) of the light that is propagating toward the world from the eyepiece is reflected and directed back toward the eye of the user, which increases the overall brightness and increases the beam density as a result of the slight lateral offset to the beams, which contributes to an improved fill factor.

Figure 2A:
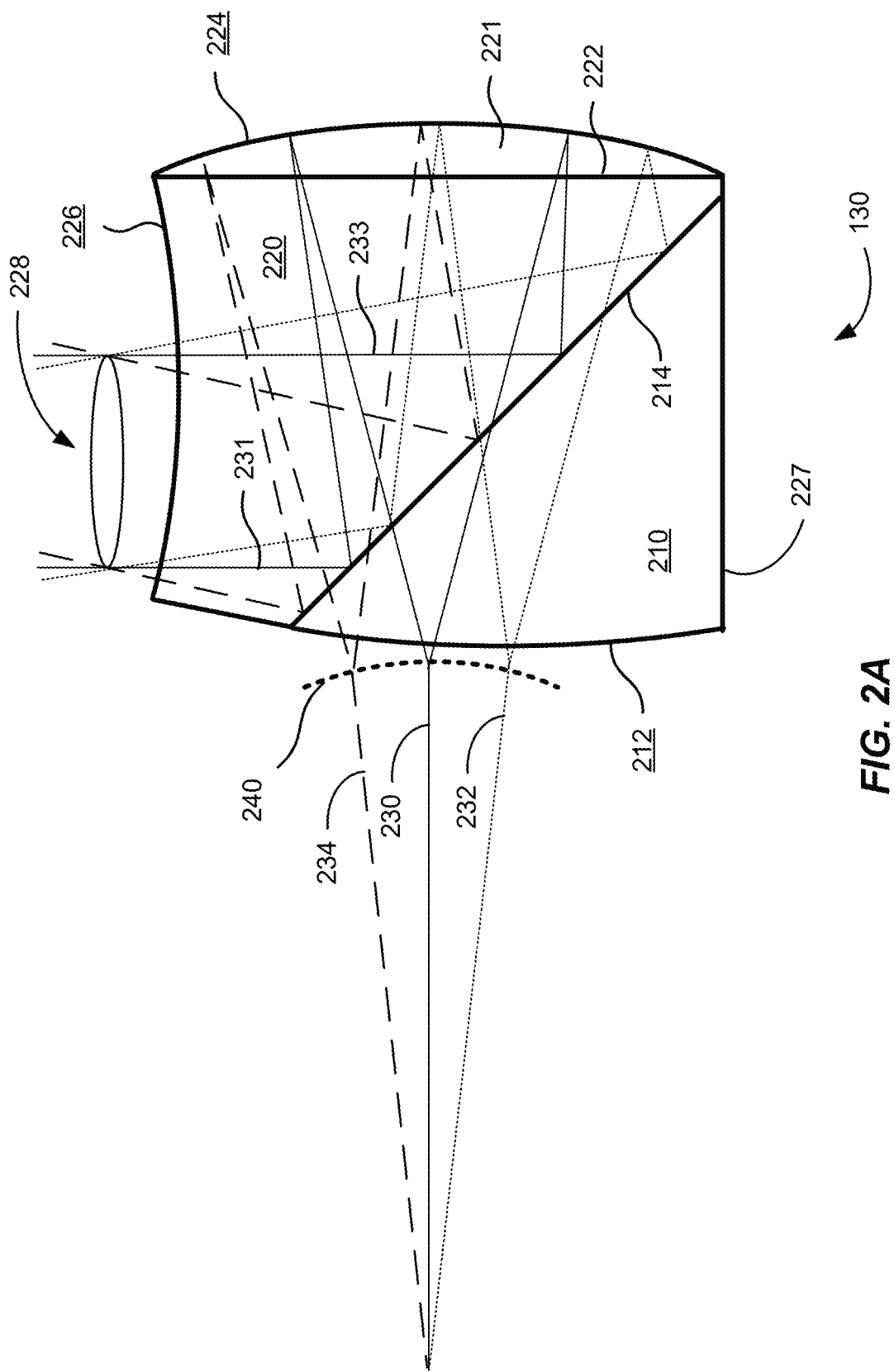
FIG. 2A is a ray tracing diagram illustrating propagation of light through the optical assembly section according to an embodiment of the present invention.

FIG. 2A is a ray tracing diagram illustrating propagation of light through the optical assembly section according to an embodiment of the present invention. The optical assembly section 130 includes a prism element 210 and a collimation element 220 coupled at an interface. In an embodiment, the prims element and the collimation element are optically bonded at the interface. As described more fully herein, one or more of the surfaces of the optical assembly section 130 can include optical power. Thus, although collimation of light in terms of collimating surface 224 is discussed herein, it will be appreciated that surfaces other than collimating surface 224 can contribute to collimation of light by the system. The scanning fiber 154 in the fiber oscillation region 120 is illustrated at three scanning positions: on axis 230 (solid lines), off axis to the right 232 (dashed lines), and off axis to the left 234 (dashed lines). As illustrated in FIG. 2A, the tip of the scanning fiber sweeps through a substantially spherical surface, illustrated by curve 240 in FIG. 2A, as it oscillates, resulting in a convex surface to be imaged, such that curve 240 can be referred to as a convex object surface.

Conventional lenses are typically designed for flat object planes or concave object surfaces. Embodiments of the present invention utilize designs in which the convex object surface 240 associated with the tip of the scanning fiber 152 is matched with the concave collimating surface 224, which, at a high level, can be a substantially spherical mirror having twice the radius of curvature of the radius of curvature of the convex object surface 240. Accordingly, in some embodiments, the majority of focusing is achieved using convex collimating surface 224, which can be implemented as a curved mirror with an aspheric correction term. Although refractive and reflective elements are illustrated in FIG. 2A, embodiments of the present invention are not limited to these implementations and diffractive surfaces, meta-surfaces, and the like can be utilized in accordance with embodiments of the present invention. For example, collimating surface 224, rather than be a reflective surface, could be a diffractive surface, a meta-surface, or the like. One of more of the other surfaces illustrated in FIG. 2A can also be implemented using diffractive structures or combinations of diffractive and/or refractive structures. An example would be a diffractive structure to compensate for chromatic aberration and a refractive structure to focus/defocus the beam. One of ordinary skill in the art would recognize many variations, modifications, and alternatives.

In addition to scanning fibers, other optical systems can be utilized to form the convex object surface 240. Examples of these optical systems include other waveguide scanning systems including MEMS-based scanning systems, a scanning mirror system with a converging beam, a scanning point source, a flat panel display combined with optics to create the curved object surface, or the like.

Embodiments of the present invention enable the optical prescriptions of the various optical surfaces to be varied to optimize size, exit pupil diameter, combined optical power, linear magnification, angular magnification, distance between the exit pupil and the output surface, and the like. Control of the curvature of the input surface 212, collimating surface 224 and output surface 226 enables various properties of the output beam to be controlled, including beam diameter, angular magnification of the angle associated with the fiber deflection (i.e., angle between scanning positions 232 and 234), and the like. It should be noted that in some implementations, beam splitter 214 can include curvature such that it is not a planar surface, thereby providing additional design freedom. This non-planar shape (i.e., non-planar curvature) can include curvature (e.g., concave or convex) to introduce optical power, compensate for aberrations, or the like. Additionally, the index of refraction of the materials used to fabricate optical assembly section 130 can be adjusted to modify the optical properties discussed above. Moreover, the beam splitter 214 can be a partially reflective (50/50 split) surface, polarizing beam splitter, a wavelength selective beam splitter, or the like.

Referring to FIG. 2A, a multiplexing functionality could be implemented if the polarizing beam splitter 214 has varying polarization, for example, as a function of time, alternately passing and reflecting incident light. Shutters integrated into the optical path between the partially reflective surface/polarizing beam splitter and the collimating surface 224/surface 227 could be utilized to multiplex between the two optical paths. Accordingly, some embodiments provide a multiplexed display with a high resolution, narrow field of view image surrounded by a lower resolution, wide field of view image. In some embodiments, surface 227 could be absorbing, providing a shutter effect when light is reflected from the polarizing beam splitter 214 toward surface 227. One of ordinary skill in the art would recognize many variations, modifications, and alternatives.

Referring once again to FIG. 2A, the scanning fiber 154 acts as a point source of light, emitting a cone of light. These cones of light as illustrated as they propagate from the convex object surface 240 through the optical assembly section 130. As the scanning fiber sweeps through the oscillatory pattern, different pixels are illuminated to form the desired image. In the embodiment illustrated in FIG. 2A, the light from the scanning fiber is polarized so that after it enters the optical assembly section 130 though input surface 212, it will pass through the polarizing beam splitter 214 with little reflection, passes through quarter wave plate 222, and impinges on the collimating surface 224. After reflection, the light passes through quarter wave plate 222 a second time and reflects off of polarizing beam splitter 214 toward output surface 226. Exit pupil 228 is formed outside the optical assembly section 130 for delivery to the eyepiece. As will be evident to one of skill in the art, for many optical systems, alignment between the exit pupil and the input plane of another optical system is preferable. Accordingly, the working distance between output surface 226 and exit pupil 228 enables embodiments of the present invention to be utilized in conjunction with a wide variety of optical systems. As an example, if the light emitted by the fiber scanning projector is utilized by a waveguide-based optical system, the input coupling element of the waveguide-based optical system could be placed coincident, for example, coplanar, with the exit pupil 228. In an embodiment, the exit pupil 228, which provides a location at which a small diameter beam is formed, can enable efficient coupling into a small input coupling element, which can be matched in size to the exit pupil, thereby efficiently utilizing the area of the waveguide-based optical system. As illustrated in FIG. 2A, the three cones of light emitted at each of the three illustrated positions 230, 232, and 234 of the scanning fiber 154, are collimated as they exit the optical assembly section as shown, for example, by collimated rays 231 and 233, which define the edges of the cone of light emitted at on axis position 230.

In another particular embodiment, the polarizing beam splitter can be replaced with a wavelength selective beam splitter such that one or more colors would pass through the beam splitter while other color(s) are reflected toward surface 227, which can be implemented as a surface with optical power. This wavelength selectivity will enable focusing through the use of diffractive elements or meta-surfaces as diffractive optics are used as an alternative to refractive optics. Thus, embodiments of the present invention can integrate meta-surfaces on one or more of the input surface 212, collimating surface 224, surface 227, and/or output surface 226 to encode multiple lens functions into a meta-surface for wavelength selective optical processing, other diffractive optical functions, dispersion compensation, or the like. In some designs, dispersion correction is provided by the various surfaces, for example, dispersion compensation can be implemented by correcting aberrations occurring at the input surface by aberration correction provided on the output surface.

Figure 2B:
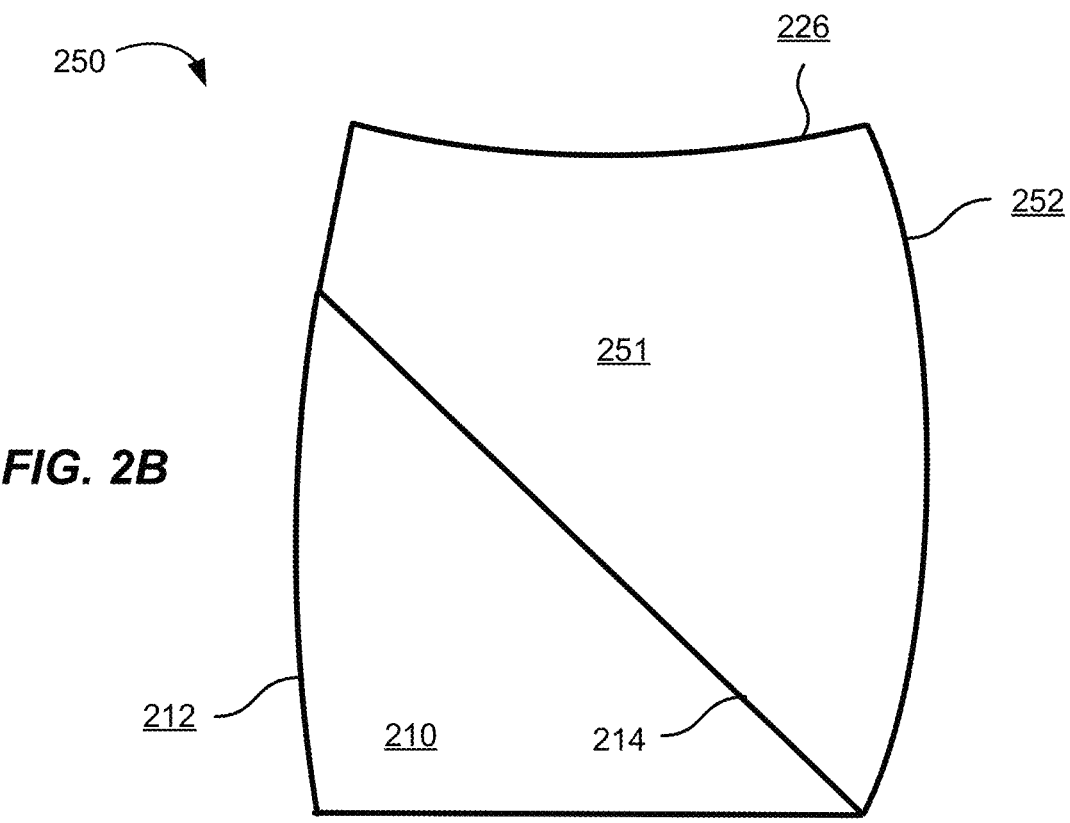
FIG. 2B is a side view of an alternative optical assembly section according to an alternative embodiment of the present invention.

As discussed in additional detail in relation to FIG. 2B, the quarter wave plate can also be fabricated by vacuum forming on the collimated surface 224. In this implementation, after formation of the quarter wave plate on the curved surface, a metallized or other suitable reflective surface could be formed to complete the fabrication of collimating surface.

In an embodiment, the input surface 212, the collimating surface 224, and the output surface 226 of the optical assembly section 130 can have optical power to compensate for spherical aberration as well as to provide for magnification of the field of view in some embodiments. Accordingly, using a smaller deflection of optical fiber in the fiber oscillation region leads to larger field of view. As an example, the input surface 212 can be convex with respect to the input light to provide positive optical power, the collimating surface 224 can be concave with respect to the light from the input surface to provide negative optical power, and the output surface can be convex with respect to light from the beam splitter to provide negative optical power. The collimating surface 224 is substantially spherical, but includes an aspheric curvature in some implementations. The aspherical curvature can correct spherical aberration and the overall curvature can result in collimation of the light by the collimating surface. The collimating surface 224 can be fabricated as a reflective element through the deposition of one or more reflective coatings, a metalized coating, or the like.

It should be noted that although collimating surface 224 can have approximately twice the radius of curvature of convex object surface 240, which can also be referred to as a curved object surface, in some embodiments, this is not required by the present invention and the input surface 212 and the output surface 226 can incorporate optical power in addition to the optical power present in collimating surface 224. Thus, as additional optical power is implemented through input surface 212 and output surface 226, the curvature of collimating surface 224 can deviate from twice the curvature of convex object surface 240. Additionally, as discussed herein, aspherical components can be integrated into the optical surfaces including input surface 212, collimating surface 224, and output surface 226.

In an exemplary fabrication process, the optical assembly section 130 is fabricated by bonding three elements together. In this process, the first element is a prism element 210 and the second element is a collimating optic section 220 that is bonded to the prism element. The prism element 220 receives light through input surface 212. A polarizing beam splitter 214 is formed at the interface of the prism element 210 and the collimating optic section 220. In some embodiments, a polarization selective coating is applied to the longest surface of the prism prior to bonding to form the polarizing beam splitter. A quarter wave plate 222 is formed on the back surface of the collimating optic section 220 and a third element comprising a curved reflective optic 221 is bonded to the quarter wave plate. As described herein, the curved reflective optic 221 includes collimating surface 224, which can be metalized or otherwise coated to provide high reflectivity.

During operation, using polarized light at the input, the majority of the polarized input light will pass through polarizing beam splitter 214 on a first pass, pass through a quarter wave plate 222, reflect and be collimated by the collimating surface 224, pass a second time through the quarter wave plate 222 (now with an orthogonal polarization state) and substantially reflect from the polarizing beam splitter toward the output surface 226.

FIG. 2B is a side view of an alternative optical assembly section according to an alternative embodiment of the present invention. Referring to FIGS. 2A and 2B, collimating optic section 220 and curved reflective optic 221 illustrated in FIG. 2A have been combined into a single (i.e., monolithic) collimating reflector 251 to form alternative optical section 250. Reflective surface 252 includes a wave plate that introduces a half wave of phase shift upon reflection. In one implementation, a quarter wave plate is formed on the right edge of the collimating reflector 251 before reflective surface 252 is formed, for example, by depositing a metal film, a dielectric film, or the like. In other embodiments, a microstructure can be utilized to introduce the half wave of phase shift upon reflection. Thus, the alternative optical section 250 is not limited to a specific manner of implementing phase retardation and reflection. One of ordinary skill in the art would recognize many variations, modifications, and alternatives.

Figure 2C:
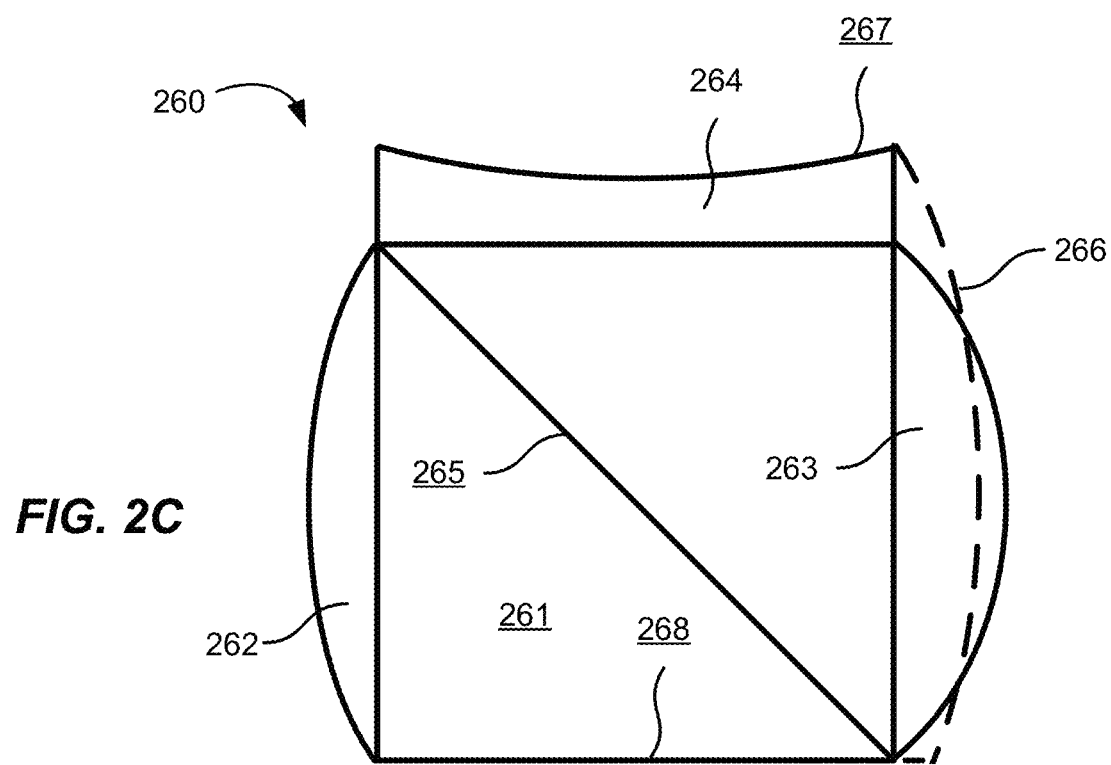
FIG. 2C side view of a beam splitter cube based optical assembly section according to an embodiment of the present invention.

FIG. 2C side view of a beam splitter cube based optical assembly section according to an embodiment of the present invention. Beam splitter cube 261 is utilized as the basis of the beam splitter cube based optical assembly section 260 and additional optical elements 262, 263, and 264 are cast onto the outer surfaces of the beam splitter cube 261 to form the input surface, the collimating surface, and the output surface, respectively. In this embodiment, a quarter wave plate can be implemented at the intersection of the beam splitter cube 261 and the optical element 263 forming the collimating surface. In an alternative embodiment, a surface 266 can be used to define the collimating surface of the optical element 263, resulting in alignment between the edge of optical element 263 and the surface 267 of optical element 264. In this alternative embodiment, it can be noted that the optical element 263 can be trimmed at the periphery to form elements with non-circular plan views, including rectangular plan views. Accordingly, optical element 263 has a trimmed surface or edge that is aligned with surface 268 of beam splitter cube 261. This alignment between edges of the various elements can facilitate registration during manufacturing, including bonding of the various elements. The use of a glass beam splitter cube 261 provides advantages including the selection of the polarization selective coatings used to fabricate the beam splitter surface 265. Additionally, manufacturability is enhanced by this design due to the wide availability of glass beam splitter cubes, including small beam splitters. In other embodiments, beam splitters of materials other than glass, including plastic, are utilized. In addition to formation of the optical elements (e.g., refractive and reflective optical elements) through casting, other techniques can be utilized to achieve optical effects, including molded elements, traditionally fabricated optics, the use of diffractive surfaces, and/or meta-surfaces, and the like.

Figure 2D:
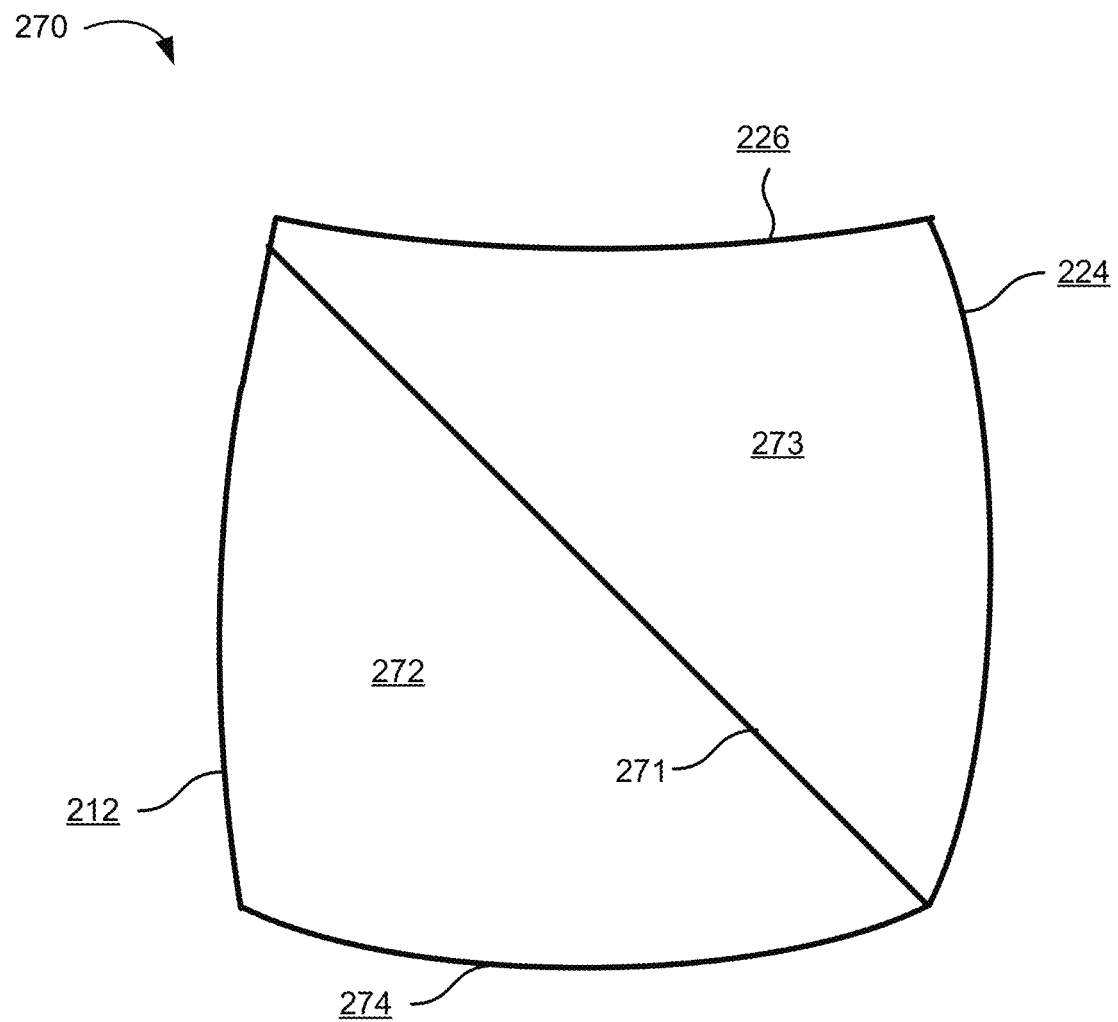
FIG. 2D is a side view of another alternative optical assembly section according to an alternative embodiment of the present invention.

FIG. 2D is a side view of another alternative optical assembly section according to an alternative embodiment of the present invention. In the alternative embodiment of the optical assembly section 270 illustrated in FIG. 2D, the polarization selective coating utilized for the polarizing beam splitter is removed along with the quarter wave plate. In this alternative embodiment, a partially reflective surface 271 (e.g., 50/50 reflector) joins the prism element 272 to the collimating element 273. Half of the light incident from input surface 212 passes to collimating surface 224 and reflects back toward the partially reflective surface 271 joining the prism element 272 and the collimating element 273. The other half of the light is reflected toward reflective surface 274, which can have the same curvature as collimating surface 224 in this alternative embodiment. As a result, light reflected from collimating surface, as well as light reflected from reflective surface 274 is collimated (given the optical power of output surface 226). The embodiment illustrated in FIG. 2D can improve optical efficiency since light that is reflected from reflective surface 274 is available for output from the optical assembly section. In an embodiment, a single exit pupil is shared by the light reflecting from collimating surface 224 as well as the light reflecting from reflective surface 274, discussed as superimposed exit pupils in relation to FIG. 2E.

Utilizing this design, different optical power can be achieved using the collimating surface 224 and reflective surface 274, which can have different curvatures, resulting in a zoomed in/out view, wide/narrow field of view, and the like as light is directed to each of these surfaces in a multiplexed manner. As an example, the reflectivity of the partially reflective surface 271 could be varied to provide time-base multiplexing.

A multiplexing functionality could be implemented since the partially reflective surface 271 could have varying reflectivity, alternately passing and reflecting incident light. Shutters integrated into the optical path between the partially reflective surface 271 and the collimating surface 224/reflective surface 274 could be utilized to multiplex between the two optical paths. Accordingly, some embodiments provide a multiplexed display with a high resolution, narrow field of view image surrounded by a lower resolution, wide field of view image. One of ordinary skill in the art would recognize many variations, modifications, and alternatives.

In another implementation, a tiled image can be formed by tilting partially reflective surface 271 at an angle other than 45° with respect to the incoming light. Light passing through the partially reflective surface 271 will reflect from collimating surface 224 and be directed in a first direction after passing through output surface 226. Light reflecting from the partially reflective surface 271 will reflect from reflecting surface 274 and be directed in a second direction after passing through output surface 226. Accordingly, light reflected from collimating surface 224 could be tilted to the left after passing through output surface 226 and light reflected from reflecting surface 274 could be tilted to the right after passing through output surface 226, thus providing inputs directed to different portions of the image field for tiled display implementations.

Figure 2E:
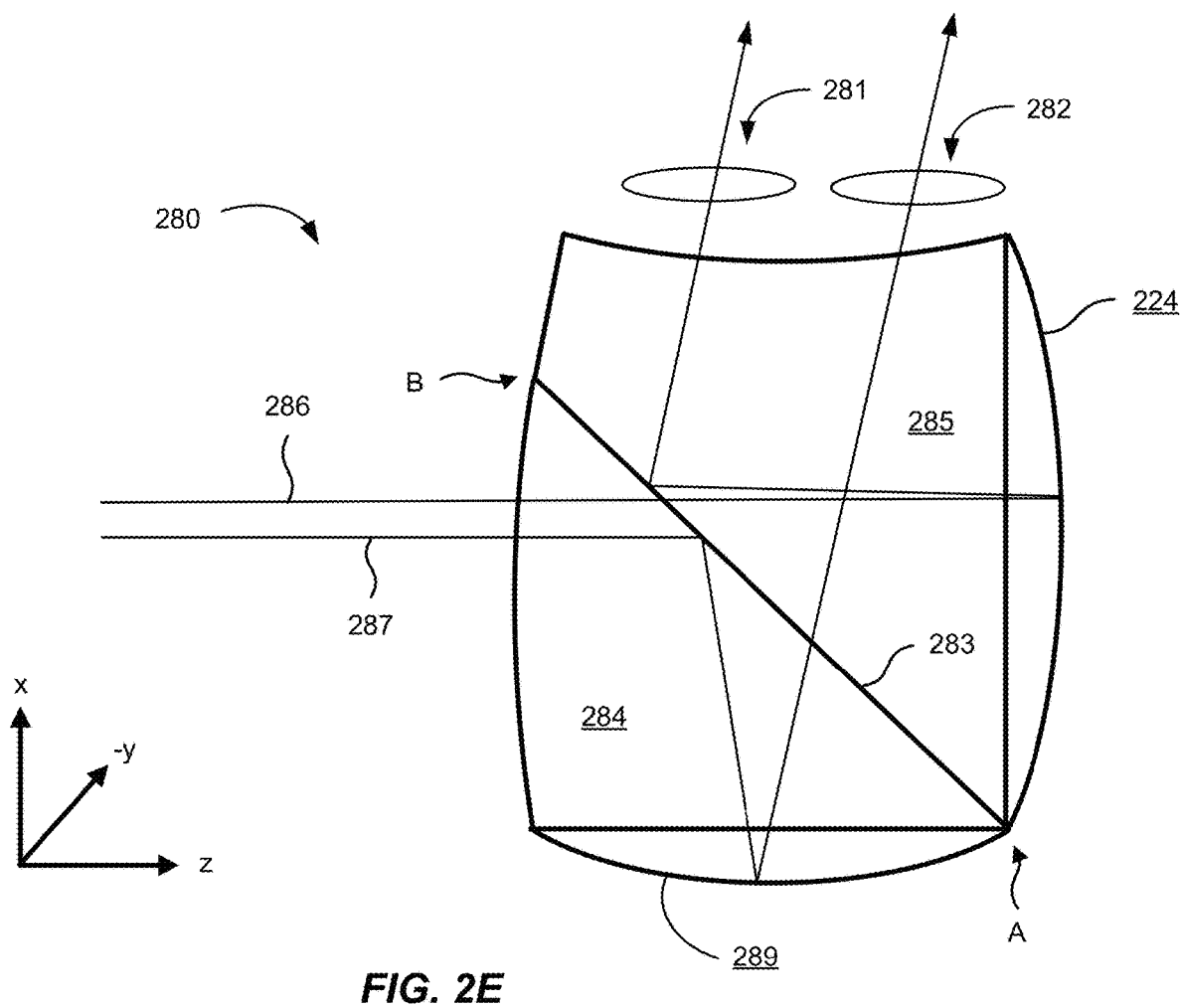
FIG. 2E is a side view of a multi-polarization tilted reflector optical assembly section according to an alternative embodiment of the present invention.

FIG. 2E is a side view of a multi-polarization tilted reflector optical assembly section according to an alternative embodiment of the present invention. In this implementation in which a polarization sensitive material forms a polarizing beam splitter 283 at the interface of the prism element 284 and the collimating element 285, similar to polarizing beam splitter 214 in FIG. 2A, the input light from the fiber scanning projector could have two signals encoded with different polarizations. A first input beam 286 encoded with a first polarization could pass through the polarization sensitive material of the polarizing beam splitter 283 to reflect off of collimating surface 224. This beam will form an exit pupil 281. The second input beam 287 encoded with the second polarization will reflect from the polarization sensitive material of the polarizing beam splitter 283 to reflect off of reflecting surface 289. This beam will form an exit pupil 282. Because the interface of the prism element 284 and the collimating element 285 are tilted at an angle other than 45° with respect to the input beams, the exit pupils 281 and 282 can be spatially offset. As an example if polarizing beam splitter 283 is color selective, an exit pupil associated with a first color (e.g., green) can be positioned adjacent an exit pupil associated with a second color (e.g., red) so that the exit pupils can provide spatially separated beams for input to the eyepiece. In addition to the spatial separation in the z-direction as illustrated in FIG. 2E, the exit pupils can be spatially separated in the x-direction or the y-direction.

Accordingly, two overlapping images could be produced or, using a tilted surface at the interface of the prism element 284 and the collimating element 285 as illustrated in FIG. 2E, two spatially separated images could be formed in the image field. Thus, two laterally separated exit pupils could be provided, which could provide input for two input coupling elements on waveguide displays. As discussed herein, the curvatures of collimating surface 224 and reflecting surface 289 can be different. For example, in a wavelength selective implementation, a wavelength selective beam splitter could be used that would pass a first color to reflect from collimating surface 224. A second color would reflect from the polarizing beam splitter and then reflect from reflective surface 289, thereby producing a beam having the second color that either diverges or converges after reflection from reflective surface 289. This could allow, for example for spatial separation between two different color channels for subsequent coupling into two different incoupling gratings, each associated with a different waveguide layer of the eyepiece. Additionally, these designs can be extended to multi-depth plane implementations in which multiple beams at each color are utilized to provide, for example, M beams at N colors for coupling into M×N waveguides. The integration of quarter wave plates can be implemented in polarization sensitive implementations. As a result, polarization selective reflectors can be implemented in conjunction with spatial separation of the pupils to enable routing of one color to a first depth plane and routing of a second color to a second depth plane. Thus, both wavelength separation as well as polarization separation are included within the scope of the present invention.

In other embodiments, the exit pupils can be disposed at the same location (i.e., superimposed). Thus, the illustration of the spatially separated pupils in FIG. 2E is merely one example and should not be understood to limit embodiments of the present invention. One of ordinary skill in the art would recognize many variations, modifications, and alternatives.

One of more of the optical surface discussed in relation to FIGS. 2A-2E can be variable focus and their focus can be controlled in conjunction with the input from the fiber scanning projector. Accordingly, rays injected into the optical assembly section at different angles can experience different optical powers. In this embodiment, a multi-focal display can be implemented as a function of field angle. Moreover, additional optical elements can be integrated with the structures described herein, for example, between the output surface and the one or more exit pupils or optically downstream of the one or more exit pupils. These additional optical elements, which can include relay optics, can have variable optical power, for example, a variable focus lens positioned between the output surface and the one or more exit pupils. Accordingly, collimated beams can be focused, aberration can be corrected, other optical effects can be implemented, or the like. In some embodiments, the shape of convex object surface 240 can vary from spherical and variable focus surfaces or additional optical elements can be utilized as appropriate for the curvature of the convex object surface. Various materials can be utilized to fabricate the structures illustrated herein, including materials that vary their index of refraction as a function of an applied bias, including liquid crystal lenses, electro-optic polymers, lithium niobate, and the like. Since the fiber scanning projector can be scanned at high frequencies, optical materials that can vary their optical properties at high frequencies are suitable for use in various embodiments. As an example, an optical structure that can modulate focal length rapidly can work with a fiber scanning projector to vary the focus on a line-by-line basis or on a pixel-by-pixel basis. These materials can be utilized in conjunction with the input surface and/or the output surface of the optical assembly section as well as in conjunction with collimating surface 224. As an example, a deformable mirror could be integrated as an element of collimating surface 224 or as a replacement for reflective surface 224. Such a deformable mirror, operating at kilohertz rates and above, can provide variable focus operation on a line-by-line basis or on a pixel-by-pixel basis as appropriate to the particular application.

The maximum distance to which prism element 284 extends in the z-direction, marked at point A in FIG. 2E, can vary according to the particular implementation. As illustrated in FIG. 2E, point A is the intersection of the right side of the collimating element 285 and the bottom of the prism element 284. The design illustrated in FIG. 2E enables a wide field of view as the tip of the scanning fiber sweeps through the substantially spherical surface, illustrated by curve 240 in FIG. 2A. In other embodiments, the surface of prism element 284 forming the right upper side of the prism element is tilted such that point A is moved to a reduced value in the z-direction. In a similar manner, point B can be moved to larger values in the x-direction as the left side of the prism element 284 is extended and the left side of the collimating element 285 is reduced. One of ordinary skill in the art would recognize many variations, modifications, and alternatives.

Figure 2F:
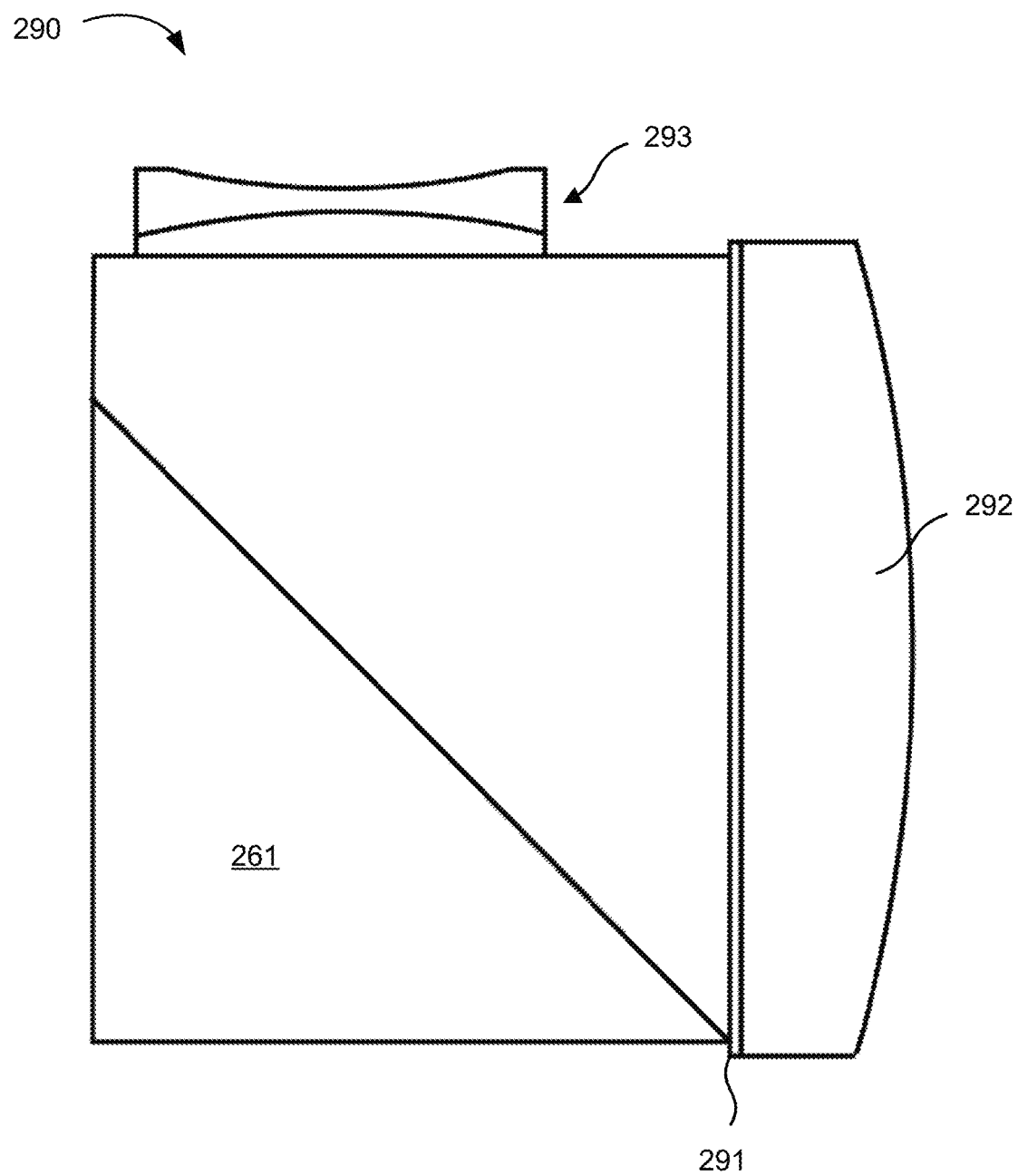
FIG. 2F is a side view of an optical assembly including a Mangin mirror according to an embodiment of the present invention.

FIG. 2F is a side view of an optical assembly including a Mangin mirror according to an embodiment of the present invention. Similar to one or more of the designs discussed above, beam splitter cube 261 is utilized as the basis of the beam splitter cube based optical assembly section 290. Quarter wave plate 291 is implemented at the intersection of the beam splitter cube 261 and the Mangin mirror 292, which provides for collimation of the input beam. In the illustrated embodiment, output lens 293 is implemented as an achromatic doublet, although other lens configurations can be utilized according to embodiments of the present invention.

Figure 2G:
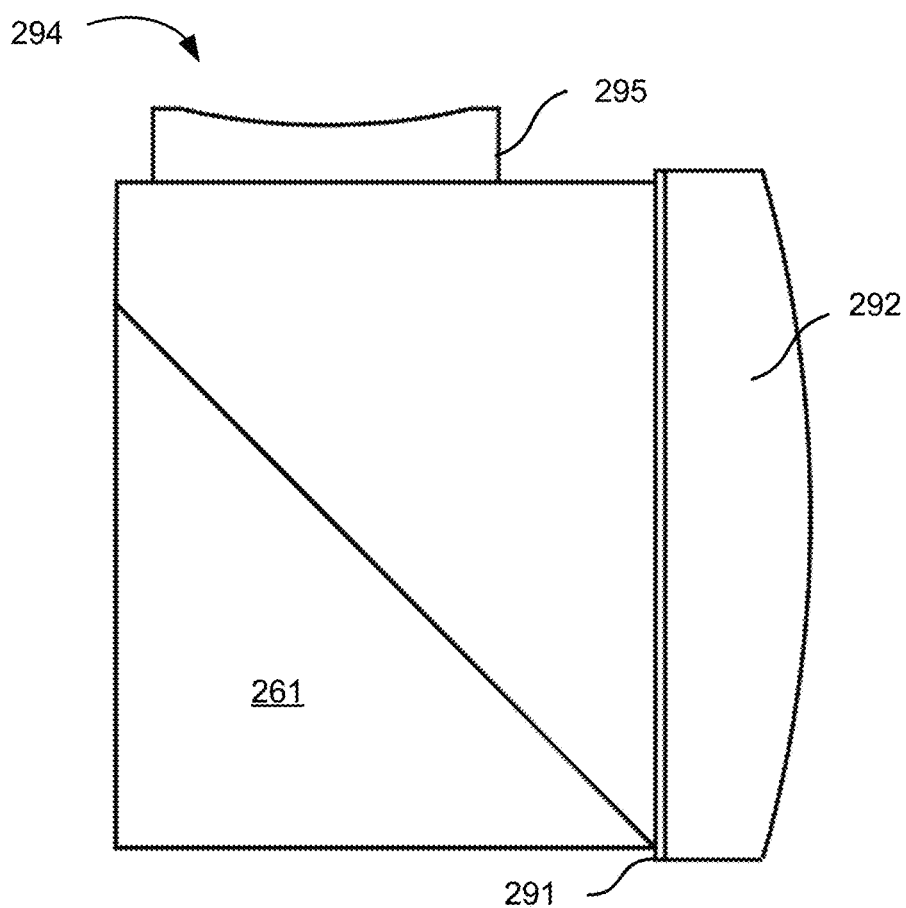
FIG. 2G is a side view of an optical assembly including a Mangin mirror according to an alternative embodiment of the present invention.

FIG. 2G is a side view of an optical assembly including a Mangin mirror according to an alternative embodiment of the present invention. In the embodiment illustrated in FIG. 2G, beam splitter cube 261 is utilized as the basis of the beam splitter cube based optical assembly section 294. Quarter wave plate 291 is implemented at the intersection of the beam splitter cube 261 and the Mangin mirror 292, which provides for collimation of the input beam. In the illustrated embodiment, output lens 295 is implemented as a molded glass lens, although other lens configurations can be utilized according to embodiments of the present invention.

Figure 2H:
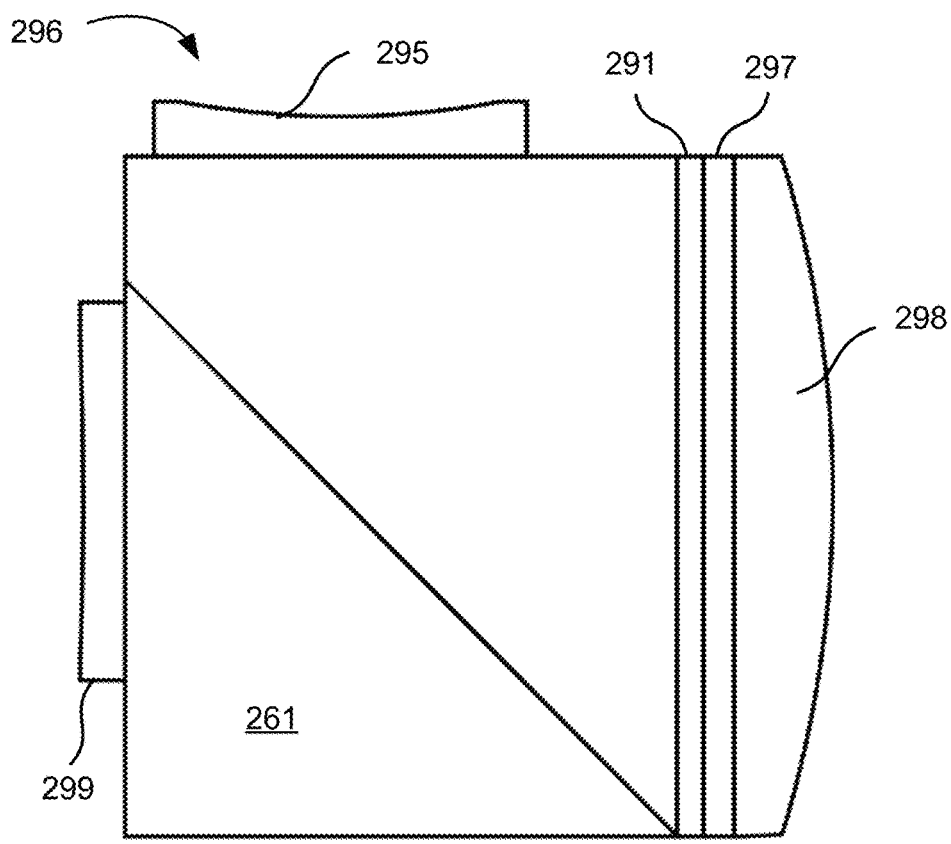
FIG. 2H is a side view of an optical assembly including a 3D printed lens according to an embodiment of the present invention.

FIG. 2H is a side view of an optical assembly including a 3D printed lens according to an embodiment of the present invention. Similar to one or more of the designs discussed above, beam splitter cube 261 and quarter wave plate 291 are utilized in optical assembly section 296. An input lens 299 and an output lens 295, which can be molded glass lenses, are utilized in this embodiment. The collimating optic, also referred to as a printed lens, is formed using 3D printing, also referred to as additive manufacturing. This collimating optic includes a substrate 297 that supports printed lens 298, for example, a polymer lens formed with curvatures associated with a Mangin lens. The substrate 297 is joined to quarter wave plate 297, for example, using an optical adhesive.

It should be noted that any of the characteristics of any of the elements and surfaces discussed or illustrated in reference to FIGS. 2A-2H are applicable to the implementations provided in any of the other implementations illustrated in FIGS. 2A-2H as appropriate. Merely by way of example, curvatures of surfaces, reflective or diffractive properties of surfaces, polarization properties, and the like are applicable to any of the implementations as appropriate.

Figure 3:
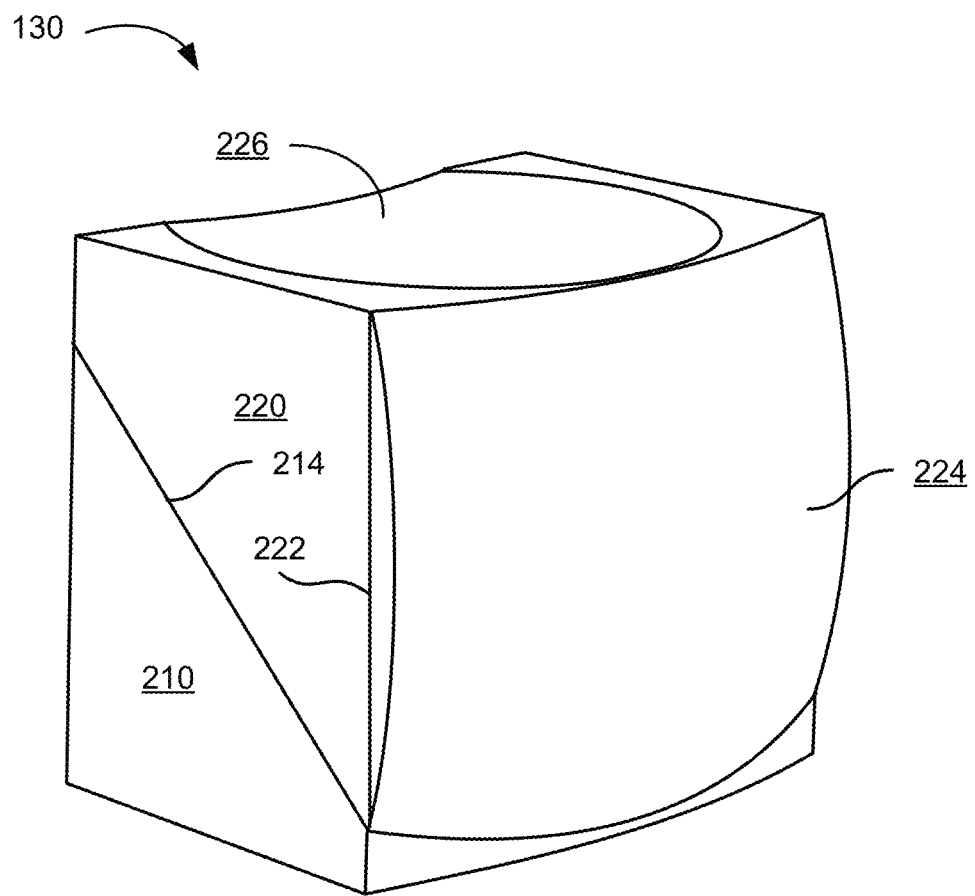
FIG. 3 is a simplified perspective view of an optical assembly section of a fiber scanning projector according to an embodiment of the present invention.

FIG. 3 is a simplified perspective view of an optical assembly section of a fiber scanning projector according to an embodiment of the present invention. The optical assembly section 130 includes prism element 210 to the collimating element 220. Light is incident on the input surface (not shown, but facing the back left) and propagates toward polarizing beam splitter 214. The edge of quarter wave plate 222, collimating surface 224, and output surface 226 are also illustrated in this view.

In some embodiments, the fiber scanning projector can achieve a 3 arcminute angular resolution and a 4×3 aspect ratio with a 50° diagonal field of view although these particular parameters are not required by the present invention. In some implementations, a 60°×30° elliptical field of view is achieved. In another embodiment, the fiber scanning projector can achieve a 2 arcminute angular resolution and a 4×3 aspect ratio with a 50° diagonal field of view. In yet another embodiment, the fiber scanning projector can achieve a 1 arcminute angular resolution or less. One of ordinary skill in the art would recognize many variations, modifications, and alternatives.

In order to reduce the size and weight of the fiber scanning projector, portions which do not support light can be trimmed, forming a wedge shaped structure that also increasing packaging flexibility, particularly for integration with eyeglasses with curved frames.

Figure 4:
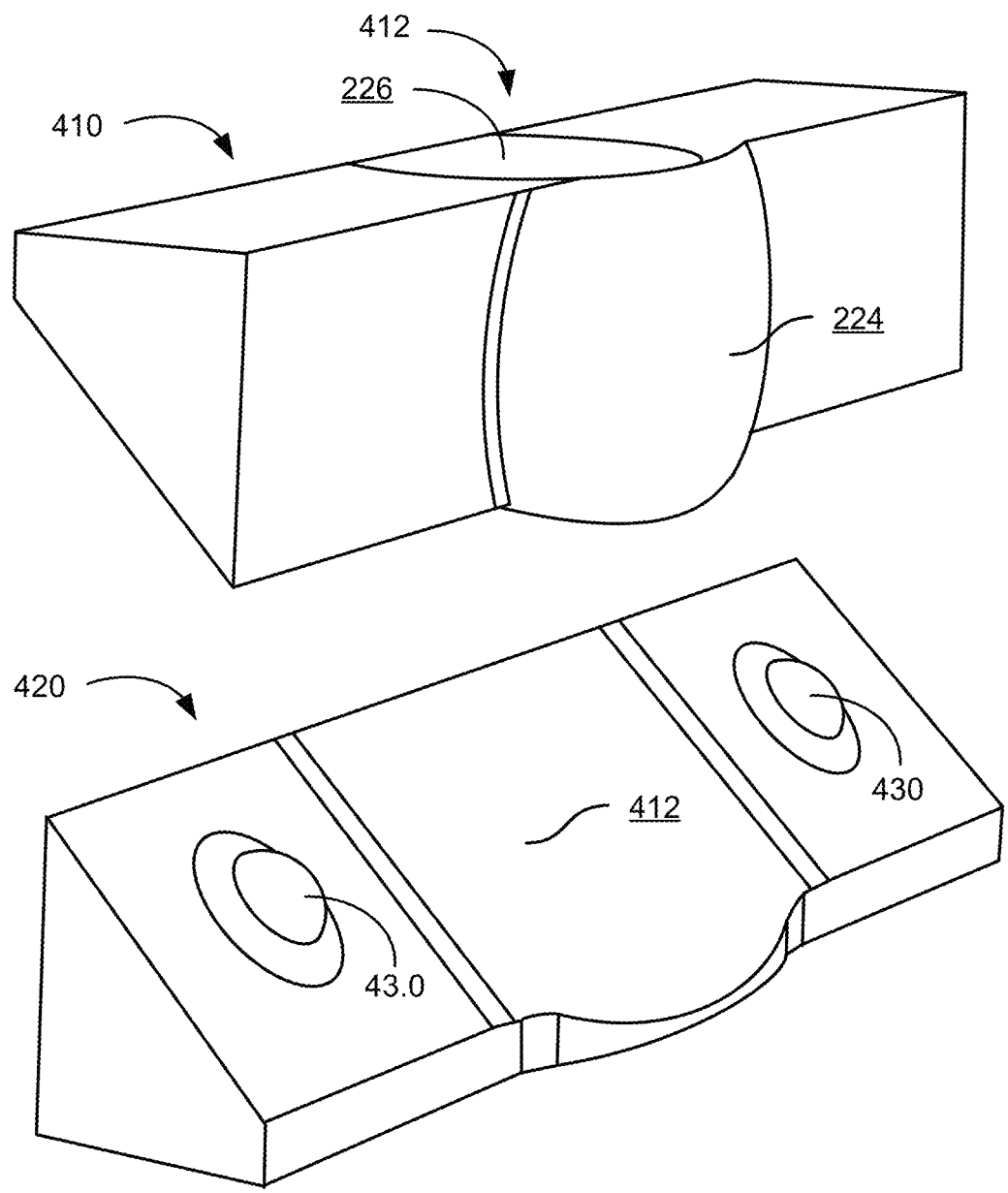
FIG. 4 is a simplified perspective view of elements of the optical assembly section during fabrication according to an embodiment of the present invention.

FIG. 4 is a simplified perspective view of elements of the optical assembly section during fabrication according to an embodiment of the present invention. As illustrated in FIG. 4, first element 410 of the optical assembly section includes a collimating optic section 412 that includes the propagation path of light after passing through the beam splitter, the collimating surface 224, and the output surface 226. Second element 420 of the optical assembly section includes the surface 412 of the prism on which the polarizing beam splitter can be formed. In this perspective view, the input surface not shown as it is facing to the back left. Alignment features 430 are integrated into the materials and are designed to match corresponding alignment features (not shown) on the bottom left surface of the first element.

In some embodiments, the second element 420 is fabricated from glass materials to facilitate the formation of the polarizing beam splitter at the interface of the first element and the second element since glass materials can be more suitable for deposition of polarization selective coatings than some plastic materials.

Figure 5:
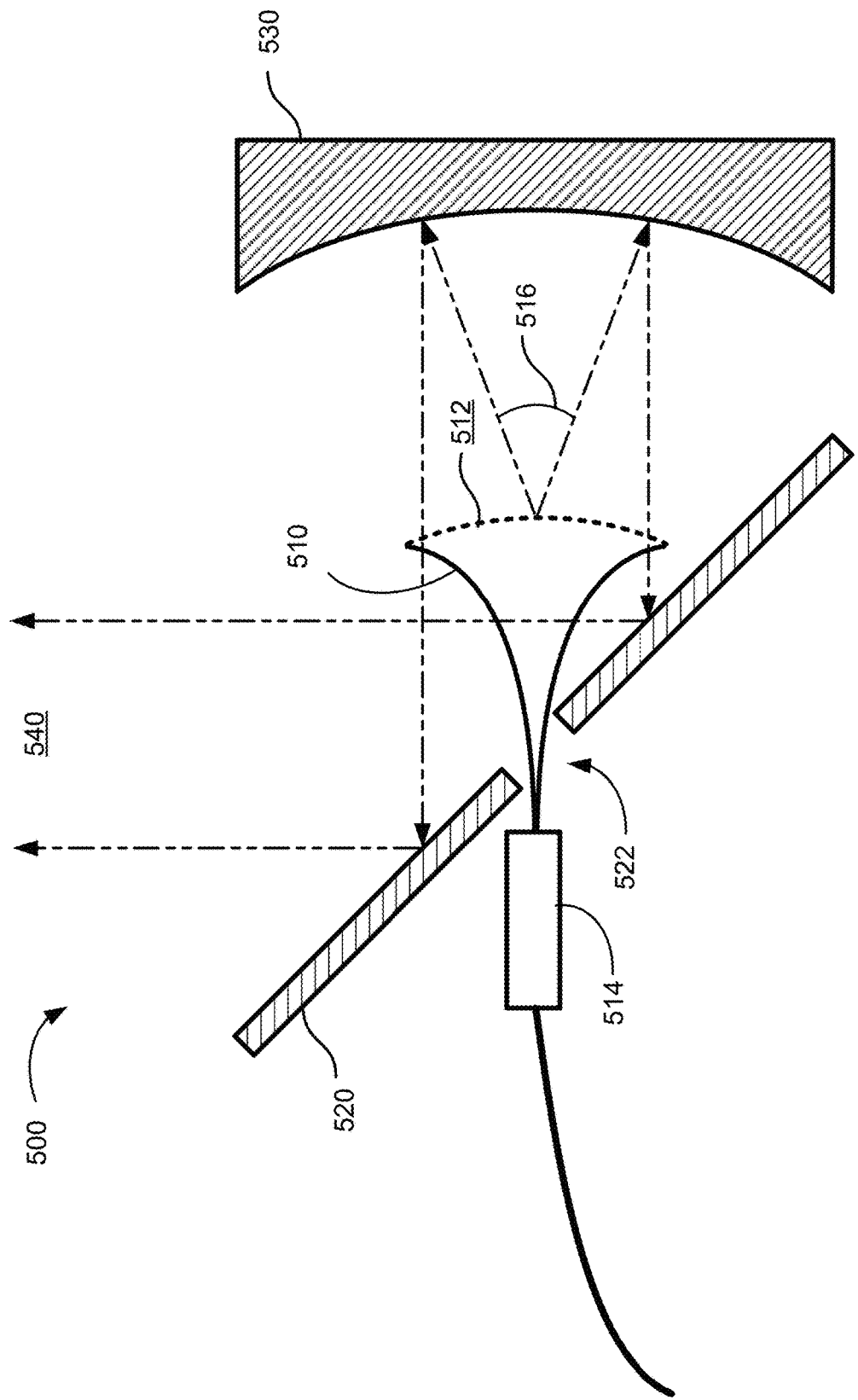
FIG. 5 is a simplified schematic diagram illustrating a fiber scanning projector 500 according to an alternative embodiment of the present invention.

FIG. 5 is a simplified schematic diagram illustrating a fiber scanning projector 500 according to an alternative embodiment of the present invention. As illustrated in FIG. 5, a scanning fiber 510 passes through an aperture 522 in mirror 520. The scanning fiber is illustrated at the ends of the range of motion. A collimating mirror 530 reflects light emitted by the scanning fiber, which is then reflected from mirror 520 to provide output beam 540. In some embodiments, the radius of curvature of collimating mirror 530 is twice the radius of curvature of spherical object surface 512.

As discussed in relation to the fiber scanning projector, as the scanning fiber 510 is actuated by piezoelectric element 514, it sweeps out a substantially spherical surface 512, also referred to as a spherical object surface. Accordingly, after reflection off of a substantially spherical reflector having twice the radius of curvature of the surface swept out by the scanning fiber, light emitted from any point along the surface swept out by the scanning fiber will be well collimated after reflection from the substantially spherical reflector.

Because the base of the fiber scanner is adjacent piezoelectric element 514, the deflection of the scanning fiber 510 at aperture 522 is small although the deflection at the tip of the scanning fiber is large (e.g., on the order of 20 degrees). As the beam is emitted from the tip of the scanning fiber, it fans out to form cone 516 of light as illustrated in FIG. 5. The collimation of the cone by substantially spherical reflector 530 provides a beam with a much larger diameter than the diameter of the scanning fiber so that the majority of the reflected light is reflected from mirror 520 with little light passing through aperture 522 in the return path.

In some implementations, the field of view of the fiber scanning projector 500 is a function of the section of arc that scanning fiber 510 subtends during oscillation. As an example, if the scanning fiber sweeps through 20 degrees, the field of view of the projector is on the order of 20 degrees. Increases in the field of view can be accomplished by increasing the range of fiber oscillation. In other embodiments, magnification of the effective field of view is available to increase the field of view independent of the range of fiber oscillation. Comparing the fiber scanning projectors in FIGS. 2 and 5, whereas the field of view associated with fiber scanning projector 500 is maintained as a result of the collimation resulting from reflection from reflector 530, optical assembly section 130 provides the illustrated optical surfaces that can be used to introduce magnification that can increase the field of view produced by the projector. As an example, modification of the curvature of output surface 226 can be utilized to magnify the field of view.

As illustrated herein, embodiments of the present invention utilize designs that are related through the use of a spherical object plane and a corresponding reflector having a curvature on the order of twice the curvature of the spherical object plane.

Figure 6A:
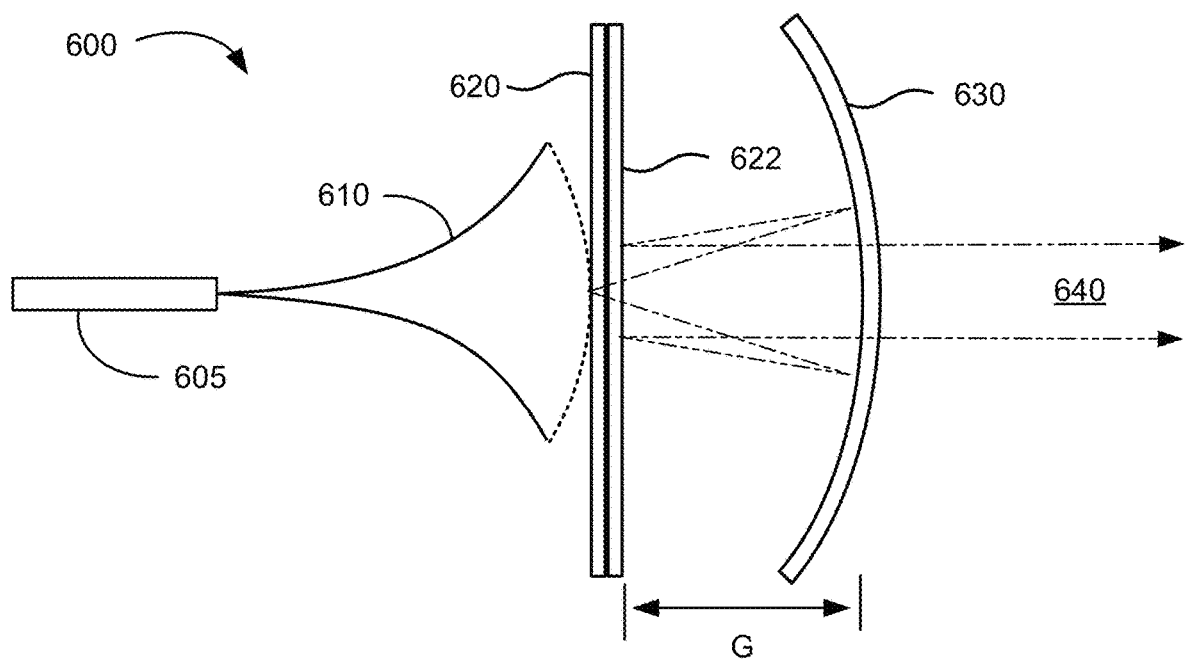
FIG. 6A illustrates a fiber scanning projector according to an alternative embodiment of the present invention.

FIG. 6A illustrates a fiber scanning projector according to an alternative embodiment of the present invention. The fiber scanning projector 600 in FIG. 6A includes a scanning fiber 610 passing through and mechanically coupled to a piezoelectric element 605, a first polarization sensitive reflector 620, and a second polarization sensitive reflector 630. A quarter wave plate 622 is integrated with the first polarization sensitive reflector.

In operation, light emitted by the scanning fiber 610 has a polarization that passes through the first polarization sensitive reflector 620 and the quarter wave plate 622. The second polarization sensitive reflector 630 reflects the incident light, which makes a second pass through the quarter wave plate 622 and, as a result, is reflected from the first polarization sensitive reflector 620 since the polarization of the light is now oriented in the orthogonal direction. After reflection from the first polarization sensitive reflector 620, the light passes through second polarization sensitive reflector 630 as an output beam 640. As illustrated in FIG. 6A, the second polarization sensitive reflector 630 is curved with a curvature that collimates the light emitted by the scanning fiber 610. As a result, the input beam, which was diverging, is converted to an output beam that is collimated.

Although the optical elements illustrated in FIG. 6A are illustrated as separated by air gaps, for example, the first polarization sensitive reflector 620 and the second polarization sensitive reflector 630 separated by air gap G, this is not required by the present invention. As an example, a solid laminated component can be utilized that includes the first polarization selective reflector, the quarter wave plate, and the second polarization selective reflector and receives light from the scanning fiber, transmits the light to a laminated curved reflector, performs polarization rotation, and then reflects light from the first polarization selective reflector. Thus, solid elements that can also include optical power can be utilized to provide for focusing/defocusing of light as well as aberration correction.

Figure 6B:
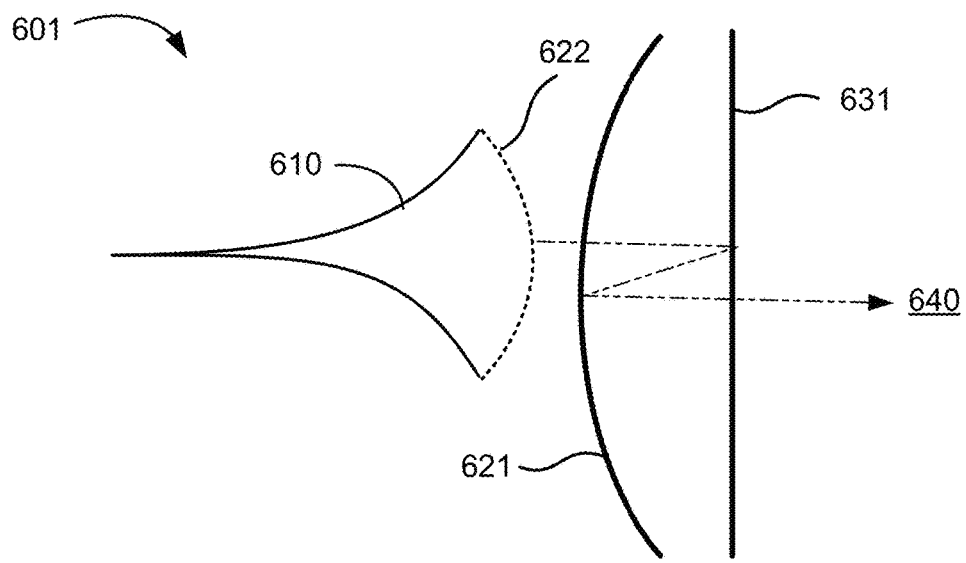
FIG. 6B is an alternative fiber scanning projector according to an embodiment of the present invention.

FIG. 6B is an alternative fiber scanning projector according to an embodiment of the present invention. The fiber scanning projector 601 illustrated in FIG. 6A shares some similarities with the fiber scanning projector 600 illustrated in FIG. 6A and the description provided in relation to FIG. 6A is applicable to the fiber scanning projector 601 illustrated in FIG. 6B as appropriate.

Referring to FIG. 6B, the fiber scanning projector 601 includes a scanning fiber 610, a first polarization sensitive reflector 621 that is curved to provide for collimation and a second polarization sensitive reflector 631 that is substantially planar. A quarter wave plate is integrated with the first polarization sensitive reflector.

In operation, light emitted by the scanning fiber 610 has a polarization that passes through the first polarization sensitive reflector 621 and the quarter wave plate. The second polarization sensitive reflector 631 reflects the incident light, which makes a second pass through the quarter wave plate and, as a result, is reflected from the first polarization sensitive reflector 621 since the polarization of the light is now oriented in the orthogonal direction. After reflection from the first polarization sensitive reflector 621, which collimates the light during reflection, the light passes through second polarization sensitive reflector 631 as an output beam 640. Comparing FIGS. 6A and 6B, the folded optical path illustrated in FIG. 6A can be replaced with a potentially shorter optical path as illustrated in FIG. 6B, but with common features of collimation.

Figure 6C:
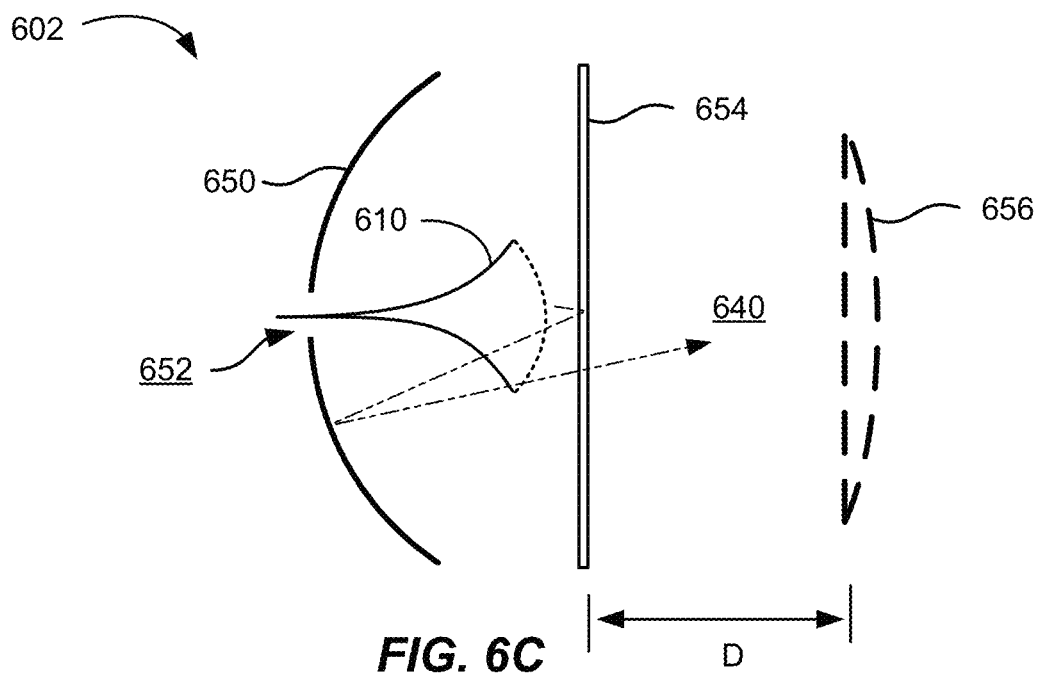
FIG. 6C is another alternative fiber scanning projector according to an embodiment of the present invention.

FIG. 6C is another alternative fiber scanning projector according to an embodiment of the present invention. The fiber scanning projector 602 illustrated in FIG. 6C shares some similarities with the fiber scanning projector 500 illustrated in FIG. 5 and the fiber scanning projector illustrated 600 in FIG. 6A and the description provided in relation to FIGS. 5 and 6A is applicable to the fiber scanning projector 602 illustrated in FIG. 6C as appropriate.

In the embodiment illustrated in FIG. 6C, scanning fiber 610 passes through an aperture 652 in curved mirror 650. A polarization selective reflector 654 reflects light during a first pass toward the curved mirror 650. By integrating a quarter wave plate in the optical path, light, after reflection and collimation from curved mirror 650 passes through the polarization selective reflector 654 during the second pass. The embodiment illustrated in FIG. 6C enables a compact configuration in a hybrid design.

As illustrated by optional lens 656, embodiments of the present invention enable additional optical elements to be placed a significant distance from the elements making up the fiber scanning projector. In this example, the distance D between the surface of the polarization selective reflector 654 and the lens 656 provides a working distance that is suitable, for example, to insert a field of view magnifier. In addition, a spherical aberration corrector could be inserted given the suitable, extended working distance provided by this embodiment.

Figure 6D:
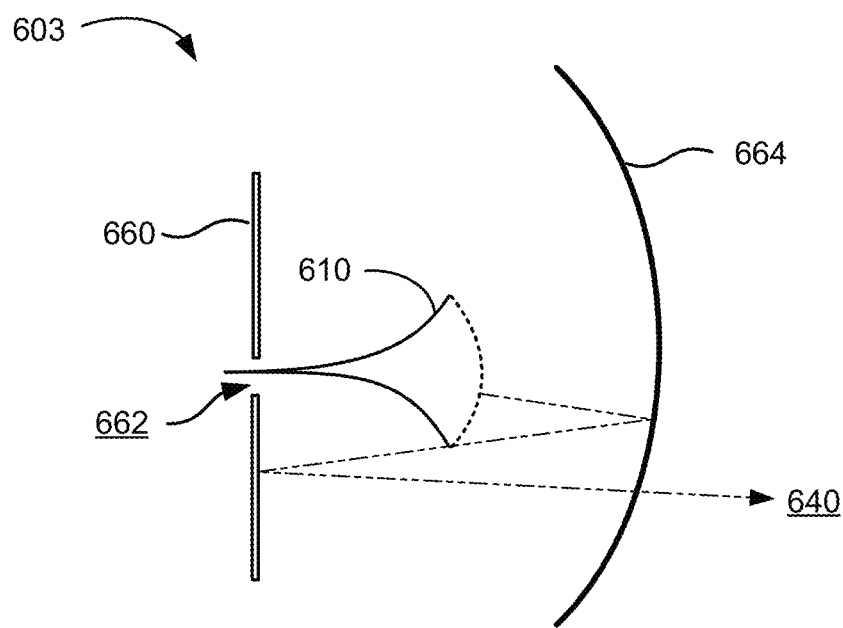
FIG. 6D is yet another alternative fiber scanning projector according to an embodiment of the present invention.

FIG. 6D is yet another alternative fiber scanning projector according to an embodiment of the present invention. The fiber scanning projector illustrated in FIG. 6D shares some similarities with the fiber scanning projector 500 illustrated in FIG. 5 and the fiber scanning projector illustrated in FIG. 6A and the description provided in relation to FIGS. 5 and 6A is applicable to the fiber scanning projector 603 illustrated in FIG. 6D as appropriate.

Referring to FIG. 6D, scanning fiber 610 passes through an aperture 662 in a planar mirror 660. A curved polarization selective reflector 664 reflects light during a first pass toward the planar mirror 660. By integrating a quarter wave plate in the optical path, light, after reflection from and collimation by the curved polarization selective reflector 664 and planar mirror 660, passes through curved polarization selective reflector 664 during the second pass. The embodiment illustrated in FIG. 6D also enables a compact configuration in a hybrid design.

Figure 7C:
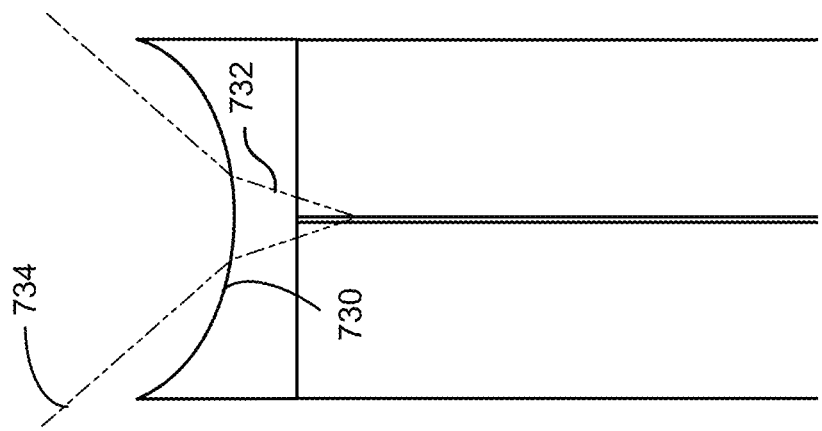
FIG. 7C is a schematic diagram illustrating a lensed fiber tip according to an alternative embodiment of the present invention.
Figure 7B:
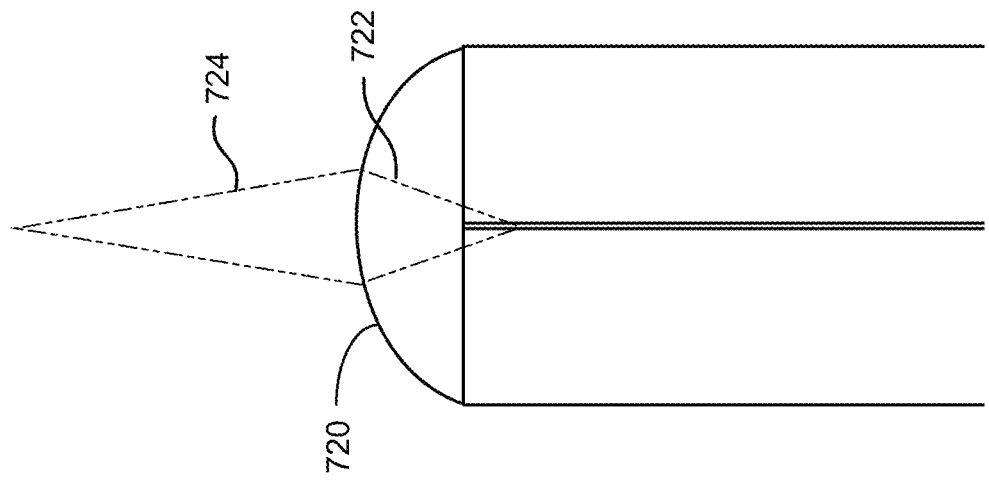
FIG. 7B is a schematic diagram illustrating a lensed fiber tip according to another embodiment of the present invention.
Figure 7A:
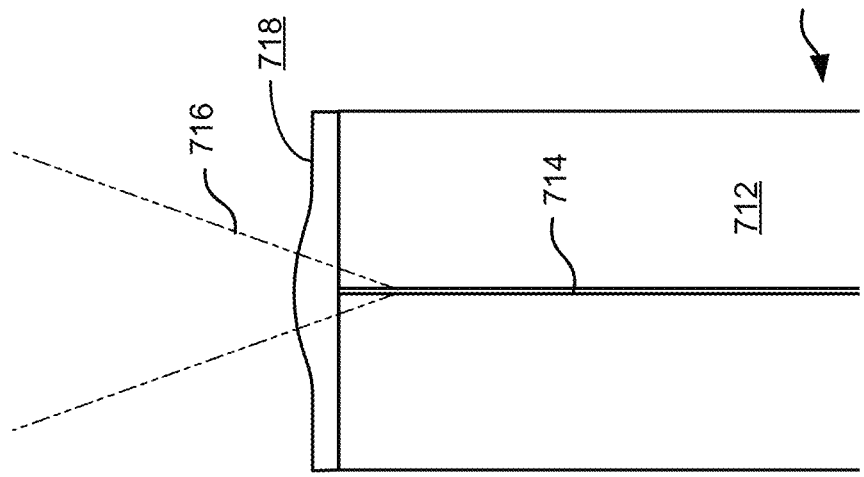
FIG. 7A is a schematic diagram illustrating a lensed fiber tip according to an embodiment of the present invention.

FIG. 7A is a schematic diagram illustrating a lensed fiber tip according to an embodiment of the present invention. As illustrated in FIG. 7A, the optical fiber 710 includes cladding 712 and fiber core 714. The optical fiber can be considered as a point light source emitting rays along an emission cone 716. In the embodiment illustrated in FIG. 7A, the point light source is illustrated as recessed within the core in the longitudinal direction. A shallow lens surface 718 can be applied to the end of optical fiber as illustrated. The lens surface 718 can be fabricated in a variety of different manners. As an example, a process utilizing focused ion beam (FIB) milling can be used to make a low stroke lens that provides for aberration correction as illustrated in FIG. 7A. In some embodiments, the lens surface 718 is formed directly on the fiber tip, whereas, in other embodiments, a mold is fabricated and the lens is formed separately from the fiber tip and then bonded to the fiber tip. One of ordinary skill in the art would recognize many variations, modifications, and alternatives.

The curvature of the lens surface 718 can be selected to remove spherical aberration resulting from optical surfaces in the system, including spherical aberration associated with collimating surface 224 illustrated in FIG. 2A, as well as with other surfaces. Accordingly, through the combination of aberration correction provided by lens surface 718 and other surfaces, high image quality is provided by embodiments of the present invention. Utilizing scanning fiber designs as discussed herein, it is possible to perform optical correction on per pixel basis in addition to performing optical correction on a display wide scale.

FIG. 7B is a schematic diagram illustrating a lensed fiber tip according to another embodiment of the present invention. In addition to aberration correction, embodiments of the present invention enable focusing of light emitted from the fiber tip as illustrated through the use of positive lens 720 illustrated in FIG. 7B. Lens 720 can be fabricated directly on the fiber tip, for example, using an FIB milling process or can be molded separately from the fiber tip and then bonded to the fiber tip. Emission cone 722 is focused by lens 720 to form focused cone 724 in this example. The strength of lens 720 may be such that light is not focused, but the spread of the rays associated with emission cone 722 is reduced.

FIG. 7C is a schematic diagram illustrating a lensed fiber tip according to an alternative embodiment of the present invention. In addition to aberration correction and focusing, embodiments of the present invention enable defocusing of light emitted from the fiber tip as illustrated through the use of negative lens 730 illustrated in FIG. 7C. Lens 730 can be fabricated directly on the fiber tip, for example, using an FIB milling process or can be molded separately from the fiber tip and then bonded to the fiber tip. Emission cone 732 is defocused by lens 730 to form diverging cone 734 in this example. Thus, some embodiments enable the numerical aperture to be increased via the use of a diverging lens on the fiber tip.

In contrast with conventional optical systems, for example, imaging an LCD into an image plane, which are constrained by the Lagrange invariant that maintains the optical invariant as a constant throughout the system, fiber scanning systems can modify the characteristics of the pixel and change the spot size emitted by the fiber. By use of the lenses illustrated in FIGS. 7B and 7C, modification of the pixel size can be accomplished, for example, effectively reducing the mode field diameter by increasing the numerical aperture, decreasing the pixel size, and decreasing the imaged spot size.

The optical effects illustrated in FIGS. 7A-7C can be combined, for example, to provide a lens tip that corrects spherical aberration and focuses emitted light, corrects spherical aberration and defocuses emitted light, corrects spherical aberration while providing a lens with a convex region near the fiber core and a concave region near the periphery of the fiber, and the like. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A fiber scanning projector comprising:
   a piezoelectric element;
   a scanning fiber passing through and mechanically coupled to the piezoelectric element, wherein the scanning fiber is configured to emit light propagating along an optical path;
   a curved reflector disposed along and perpendicular to the optical path, wherein the curved reflector includes an aperture and the scanning fiber passes through the aperture;
   a planar polarization sensitive reflector disposed along and perpendicular to the optical path; and
   a quarter wave plate disposed between the curved reflector and the planar polarization sensitive reflector.

2. The fiber scanning projector of claim 1 wherein the quarter wave plate is integrated with the planar polarization sensitive reflector.

3. The fiber scanning projector of claim 1 wherein the curved reflector, the quarter wave plate, and the planar polarization sensitive reflector are contained in a solid laminated component having optical power.

4. A method of generating light with a fiber scanning projector, the method comprising:
   directing light along an optical path, wherein the light is generated by a scanning fiber mechanically coupled to a piezoelectric element and passing through a reflector including an aperture;
   passing the light through a a quarter wave plate during a first pass;
   reflecting the light off of a polarization sensitive reflector disposed along the optical path;
   passing the light through the quarter wave plate during a second pass;
   reflecting the light off of the reflector;
   passing the light through the quarter wave plate during a third pass; and
   passing the light through the polarization sensitive reflector.

5. The method of claim 4 wherein the reflector is planar and the polarization sensitive reflector is curved.

6. The method of claim 4 wherein the reflector is curved and the polarization sensitive reflector is planar.

7. The method of claim 4 wherein the quarter wave plate is integrated with the polarization sensitive reflector.

8. The method of claim 4 wherein the reflector, the quarter wave plate, and the polarization sensitive reflector are contained in a solid laminated component.

9. The method of claim 8 wherein the solid laminated component has an optical power.

10. A fiber scanning projector comprising:
a piezoelectric element;
a scanning fiber passing through and mechanically coupled to the piezoelectric element, wherein the scanning fiber is configured to emit light propagating along an optical path;
a planar reflector disposed along and perpendicular to the optical path, wherein the planar reflector includes an aperture and the scanning fiber passes through the aperture;
a curved polarization sensitive reflector disposed along and perpendicular to the optical path; and
a quarter wave plate disposed between the planar reflector and the curved polarization sensitive reflector.

11. The fiber scanning projector of claim 10 wherein the quarter wave plate is integrated with the curved polarization sensitive reflector.

12. The fiber scanning projector of claim 10 wherein the planar reflector, the quarter wave plate, and the curved polarization sensitive reflector are contained in a solid laminated component having optical power.

13. The fiber scanning projector of claim 10 wherein the quarter wave plate and the curved polarization sensitive reflector are separated by an air gap.

14. The fiber scanning projector of claim 10 wherein an output surface of the scanning fiber defines a spherical object surface.

15. The fiber scanning projector of claim 1 further comprising a lens disposed along the optical path and configured to adjust a working distance of the fiber scanning projector.

16. The fiber scanning projector of claim 15 wherein the planar polarization sensitive reflector and the lens are separated by the working distance.

17. The fiber scanning projector of claim 15 further comprising a field of view magnifier disposed between the planar polarization sensitive reflector and the lens.

18. The fiber scanning projector of claim 15 further comprising a spherical aberration corrector disposed between the planar polarization sensitive reflector and the lens.

19. The fiber scanning projector of claim 1 wherein the quarter wave plate and the curved reflector are separated by an air gap.

20. The fiber scanning projector of claim 1 wherein an output surface of the scanning fiber defines a spherical object surface.

* * * * *